US008657448B2

(12) United States Patent
Kobayashi et al.

(10) Patent No.: US 8,657,448 B2
(45) Date of Patent: Feb. 25, 2014

(54) POLARIZATION CONVERTING ELEMENT, POLARIZATION CONVERTING UNIT, AND PROJECTION-TYPE IMAGING DEVICE

(75) Inventors: Shuho Kobayashi, Matsumoto (JP); Mitsuru Miyabara, Matsumoto (JP); Makoto Sakurai, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 106 days.

(21) Appl. No.: 13/482,569

(22) Filed: May 29, 2012

(65) Prior Publication Data
US 2012/0307167 A1 Dec. 6, 2012

(30) Foreign Application Priority Data

May 30, 2011 (JP) ................................. 2011-120966

(51) Int. Cl.
| G03B 21/00 | (2006.01) |
| G03B 21/14 | (2006.01) |
| G03B 21/28 | (2006.01) |
| G02B 5/30 | (2006.01) |
| G02B 27/28 | (2006.01) |
| G02F 1/1335 | (2006.01) |

(52) U.S. Cl.
USPC . 353/20; 353/33; 353/81; 349/9; 359/489.01; 359/489.08; 359/489.09; 359/489.11

(58) Field of Classification Search
USPC ........... 353/20, 22, 30–31, 33, 50–51, 81, 94, 353/98–99; 349/5, 9; 359/483.01, 485.01, 359/489.01, 489.06, 489.08–489.09, 359/489.11–489.13, 489.15–489.17
See application file for complete search history.

(56) References Cited

U.S. PATENT DOCUMENTS

| 5,283,600 | A | * | 2/1994 | Imai ................................. 353/34 |
| 5,357,370 | A | * | 10/1994 | Miyatake et al. ......... 359/485.02 |
| 6,144,492 | A | * | 11/2000 | Iwamura et al. ......... 359/485.03 |
| 6,312,130 | B2 | * | 11/2001 | Haba et al. ...................... 353/34 |
| 6,513,953 | B1 | * | 2/2003 | Itoh ................................. 362/331 |
| 6,535,334 | B2 | * | 3/2003 | Kane ........................ 359/485.06 |
| 6,846,079 | B2 | * | 1/2005 | Ogawa et al. ................... 353/20 |
| 7,002,743 | B2 | * | 2/2006 | Seo et al. ................. 359/485.05 |
| 7,008,070 | B2 | * | 3/2006 | Nishida et al. .................. 362/19 |
| 7,286,290 | B2 | * | 10/2007 | Hayashi ................... 359/489.09 |
| 7,828,443 | B2 | * | 11/2010 | Fuse et al. ....................... 353/20 |
| 8,186,832 | B2 | * | 5/2012 | Hayashi et al. ................. 353/20 |
| 8,477,272 | B2 | * | 7/2013 | Oto .............................. 349/117 |

FOREIGN PATENT DOCUMENTS

| JP | A-58-194004 | 11/1983 |
| JP | A-59-62807 | 4/1984 |
| JP | A-2000-298212 | 10/2000 |
| JP | A-2004-029168 | 1/2004 |

(Continued)

*Primary Examiner* — Tony Ko
*Assistant Examiner* — Jori S Reilly-Diakun
(74) *Attorney, Agent, or Firm* — Oliff PLC

(57) ABSTRACT

A polarization separating element is configured to include a translucent substrate formed of a crystal material having birefringent properties and optically rotatory power and a polarization separating portion formed on the incidence-side surface of the translucent substrate so as to transmit a P-polarized light beam and reflect an S-polarized light beam. A reflecting element that reflects the S-polarized light beam reflected by the polarization separating portion is disposed so as to be separated approximately in parallel to the translucent substrate. A predetermined function is set such that the P-polarized light beam having passed through the polarization separating portion and been incident to the translucent substrate is converted so as to be parallel to the polarization plane of the S-polarized light beam so that the P-polarized light beam is output as the S-polarized light beam.

20 Claims, 21 Drawing Sheets

(56) References Cited

FOREIGN PATENT DOCUMENTS

| JP | B2-3610764 | 1/2005 |
| JP | A-2005-158121 | 6/2005 |
| JP | B2-4080265 | 4/2008 |
| JP | A-2009-103863 | 5/2009 |
| JP | A-2009-128568 | 6/2009 |
| JP | B2-4337935 | 9/2009 |
| JP | A-2009-244520 | 10/2009 |
| JP | A-2010-060770 | 3/2010 |
| JP | A-2010-134414 | 6/2010 |
| JP | B2-4527986 | 8/2010 |
| WO | WO 98/23993 A1 | 6/1998 |

* cited by examiner

POLARIZATION CONVERTING ELEMENT, POLARIZATION CONVERTING UNIT, AND PROJECTION-TYPE IMAGING DEVICE

BACKGROUND

1. Technical Field

The present invention relates to a polarization converting element, and a polarization converting unit and a projection-type imaging device each including the polarization converting element.

2. Related Art

A projection-type imaging device such as a liquid crystal projector is configured to modulate light emitted from a light source device in accordance with image information and enlarge and project the modulated optical image on a screen. In this liquid crystal projector, a polarization converting element is used in order to improve light utilization efficiency. The polarization converting element splits light having random polarization emitted from the light source device (hereinafter referred to as random light) into a plurality of intermediate light beams, converts the split intermediate light beams into one type of linearly polarized light beams, and outputs the linearly polarized light beams in a unified manner. The random light means light in which P-polarized light and S-polarized light of which the polarization planes are orthogonal to each other are mixed, or in which polarized light such as linearly polarized light, circularly polarized light, or elliptically polarized light of which the directions of the polarization planes are diversely mixed.

The polarization converting element has a structure in which a polarization separating film and a reflecting film are alternately disposed inside a transparent member to form a polarization beam splitter array, and a retardation plate is provided on a surface of the polarization beam splitter array. A plurality of retardation plates are disposed every predetermined interval on an exit-side surface of the transparent member at positions corresponding to the polarization separating films (see JP-A-2000-298212, for example).

In the related art, a ½-wavelength plate formed of an organic material such as, for example, a polycarbonate film is used as the retardation plate, and the ½-wavelength plate and the polarization beam splitter array are bonded by an organic adhesive agent.

The polarization converting element may be manufactured by the following method. A first translucent substrate formed of a colorless transparent glass, in which a polarization separating film and a reflecting film are formed on both principal surfaces thereof, respectively, and a second translucent substrate in which nothing is formed on both principal surfaces thereof are alternately stacked on each other to form a stacked structure. Alternatively, a first translucent substrate in which a polarization separating film is formed on one surface thereof and a second translucent substrate in which a reflecting film is formed on one surface thereof are alternately stacked on each other to form a stacked structure. The stacked structure is cut at an angle of 45 deg, for example, with respect to a plane parallel to the stacked surface to obtain a polarization beam splitter array. A ½-wavelength plate is bonded to an exit surface of the polarization beam splitter array by an adhesive agent.

The polarization converting element manufactured in this way is mounted in an optical engine of a liquid crystal projector in a state of being incorporated into a frame having a rectangular surface (see Japanese Patent No. 3610764, for example).

As the output power of a white light source lamp increases and the arc length thereof decreases, a thermal load imposed on a polarization beam splitter array and a ½-wavelength plate bonded to the polarization beam splitter array also increases. Thus, the use of a quartz crystal as a constituent material of the ½-wavelength plate is considered. A liquid crystal projector applicable to a case where a ½-wavelength plate is disposed to be bonded to the exit surface of the polarization beam splitter array by an adhesive agent is known. In the liquid crystal projector, an adhesive agent made of an ultraviolet curable resin or an inorganic material having excellent resistance to heat and light is used as the adhesive agent so that forced air cooling by a cooling fan becomes unnecessary (see JP-A-2009-103863, for example).

A polarization converting element in which a stacked structure obtained by repeatedly stacking a translucent plate member having two parallel surfaces, a reflecting film, a translucent plate member having two parallel surfaces, a ½-wavelength plate, and a polarization separating film in that order is cut at a predetermined angle with respect to the stacked surface thereof, so that the polarization separating film, the retardation plate, and the reflecting film are disposed in a state of being inclined in the same direction with respect to the cutting surface, and an incident surface and an exit surface are formed so as to be parallel to each other is known (see Japanese Patent No. 4080265, for example). A polarization converting element having the same structure as Japanese Patent No. 4080265 in which a Y-cut quartz crystal plate (the angle between a normal of a principal surface of a substrate and a crystal optical axis is 90 deg) having a thickness of 22.7 to 37.1 μm is disposed in an inclined state as the ½-wavelength plate is known (see JP-A-2009-128568, for example). A ½-wavelength plate made up of two wavelength plates in which first and second quartz crystal plates are stacked in a state where the plate thicknesses are set to 21.2 μm to 50.0 μm and 13.5 μm to 31.9 μm, respectively, and first and second optical axis azimuth angles of the optical axes thereof are 16.3 deg and 59.6 deg, respectively, is proposed (see JP-A-2009-244520, for example). In the related art of JP-A-2009-244520, polarization conversion efficiency (referred to as tricolor polarization conversion efficiency) of 0.8 or more is obtained when averaged by a tricolor wavelength region (wavelengths of 400 nm to 700 nm).

In recent years, as the demand for extending the service life of optical components increases, deterioration of an adhesive agent has become a problem.

To solve this problem, a method of bonding two translucent substrates formed of a glass or a quartz crystal is proposed (see Japanese Patent No. 4337935, for example). In this bonding method, a bonding film including an Si-skeleton having siloxane (Si—O) bonds on its surface and the degree of crystallinity of 45% or less and elimination groups including organic groups bonded to the Si-skeleton is formed by a plasma polymerization method. When energy is applied to the bonding film, the elimination groups present near the surface of the bonding film are eliminated from the Si-skeleton, so that the region of the surface of the bonding film develops a bonding property, whereby the two translucent substrates are bonded together.

By employing this bonding method, the bonding means is made inorganic, and the problem of deterioration of the bonding film is solved. Moreover, it is possible to achieve a long service life of optical components bonded using the bonding method.

In the related art, a polarization converting element which has an incidence surface and an exit surface substantially parallel to the incidence surface is proposed (see JP-A-2010-

60770, for example). In the polarization converting element, a plurality of transparent members, a polarization separating film, a reflecting film, a phase plate, and a plasma polymerization film are disposed along the incidence surface and the exit surface. Either the polarization separating film or the reflecting film is provided on the inclined surface of some of the plurality of transparent members. The plasma polymerization film is provided at least one of the surface of the inclined surface of the transparent member, the surface of the polarization separating film, and the surface of the reflecting film. In the related art of JP-A-2010-60770, the plasma polymerization film achieves molecular bonding at least between the adjacent transparent member and reflecting film, the adjacent transparent member and phase plate, and the adjacent phase plate and polarization separating film, and the plasma polymerization film is mainly made up of polyorganosiloxane.

However, in the related art of JP-A-2010-60770, the plasma polymerization bonding film has a very small thickness in the order of tens of nm. When a foreign material such as dust adheres on the surface of the translucent substrate in the course of forming the bonding film on the surface of the translucent substrate using a plasma polymerization method, since the height of the foreign material is much larger than the thickness of the bonding film, the translucent substrates are not bonded together in a predetermined region around the region where the foreign material adheres. Thus, there is a problem in that bubbles or the like may be included in the region, which has an adverse effect on optical characteristics, bonding reliability, and product service life.

WO98-23993 is an example of a related art which does not use the plasma polymerization film. In WO98-23993, an optical block has a configuration in which optical components such as a planar polarization beam splitter (PBS), a mirror, and ½-wavelength plate are mounted on a groove formed on a substrate. The PBS is formed by depositing, on a surface of a glass plate, a dielectric multi-layer film or the like obtained by stacking alternately and repeatedly $TiO_2$ (high refractive index material) and $SiO_2$ (low refractive index material), for example. The PBS is press-fitted to the substrate at a predetermined angle with respect to an incidence direction of light. The mirror is formed by depositing aluminum, a dielectric multi-layer film, or the like, for example, on a surface of a rectangular glass plate, so that incident light can be reflected by the mirror. The mirror is mounted on the substrate at such an angle that an S-wave reflected by the PBS is reflected to an exit side. The ½-wavelength plate is formed by bonding a uniaxially stretched ½-phase difference film of polycarbonate, polyvinyl alcohol, or polyethylene terephthalate, for example, to a rectangular glass plate. The ½-wavelength plate is mounted at a position where the S-wave (S-polarized light beam) reflected by the mirror is incident, and the S-wave is converted into a P-wave (P-polarized light beam) and output. By forming the optical block using the PBS, the mirror, the ½-wavelength plate, and the like, it is possible to polarize randomly polarized incident light including P-wave (P-polarized light beam) and S-wave (S-polarized light beam) and output only P-wave (P-polarized light beam) in a unified manner. Moreover, it is possible to make the areas of the incidence and exit sides substantially identical to each other.

A quartz crystal has optically rotatory power as well as birefringent properties. It is well known that there is a problem in that the optically rotatory power has an influence on the retardation characteristics of a quartz crystal wavelength plate.

To solve this problem, a ¼-wavelength plate in which two wavelength plates formed of an optical crystal material having optically rotatory power are stacked so that the crystal optical axes thereof cross each other at a predetermined angle is proposed (see JP-A-2005-158121, for example). In the ¼-wavelength plate, the trajectories of polarized light beams are analyzed using the Poincare's sphere model, and the relations between a birefringent phase difference of both wavelength plates, an optical axis azimuth angle, optically rotatory power, and the angle between a rotation axis and a neutral axis are configured to satisfy a predetermined relational expression obtained by an approximate expression. By doing so, the influence of optically rotatory power is suppressed, and better wide-band characteristics are obtained.

A ¼-wavelength plate made up of one wavelength plate formed of an inorganic material such as a quartz crystal is proposed (see JP-A-2010-134414, for example). The ¼-wavelength plate is formed of a crystal plate formed of an inorganic material such as a quartz crystal which has birefringent properties and optically rotatory power and which exhibits reliability and sufficient resistance to blue-violet laser having a very short wavelength and high output power. The ¼-wavelength plate has excellent optical characteristics capable of obtaining optimum ellipticity of 0.9 or more or a value substantially close to 1.

Furthermore, a polarization converting element in which a ½-wavelength plate formed of a quartz crystal substrate is disposed to be inclined at 45 deg, a wire grid polarizer is disposed on an incidence surface side to function as a polarization beam splitter, and glass substrates having a reflecting mirror formed on the principal surfaces thereof are alternately disposed in parallel to the principal surface of the ½-wavelength plate is known (see JP-A-2004-029168, for example). A wire grid-type polarizer in which linear metallic thin wires are disposed at same intervals in parallel to each other on a transparent polycarbonate plate having birefringent properties or a substrate formed of an inorganic material such as calcite is known (see Japanese Patent No. 4527986, for example). In this wire grid-type polarizer, the direction where the refractive index is lowest within the substrate surface is orthogonal to the longitudinal direction of the metallic thin wires, and the substrate having birefringent properties is a ½-wavelength plate. Moreover, the direction where the refractive index is lowest within the substrate surface crosses the longitudinal direction of the metallic thin wires at an inclination angle of 45 deg.

However, in the related art disclosed in WO98-23993, the PBS is a polarization separating film which is formed by depositing, on the surface of the glass substrate, a dielectric multi-layer film or the like obtained by stacking alternately and repeatedly $TiO_2$ (high refractive index material) and $SiO_2$ (low refractive index material) on a glass plate. Therefore, there is a problem in that peeling may occur at the interface between the glass substrate and the polarization separating film due to thermal strain resulting from a difference in thermal expansion coefficient. Moreover, the glass plate has a limited heat-dissipation effect. Therefore, it is difficult to sufficiently meet the increasing demand for heat resistance and long service life.

Therefore, by taking a heat-dissipation effect into consideration, by forming the PBS on the surface of a quartz crystal plate instead of the glass plate as disclosed in JP-A-2004-029168, it is possible to realize a polarization converting element having heat resistance and long service life.

However, as described above, since a quartz crystal has optically rotatory power as well as birefringent properties, it is difficult to solve the problem of optically rotatory power just by using the quartz crystal plate instead of the glass plate and determining the azimuth of the crystal optical axis so as to create a phase difference (180 deg) from the relation with the polarization plane of incident linearly polarized light. Therefore, there is a problem in that an optical effect resulting from the optically rotatory power occurs in the incident linearly polarized light.

Therefore, the present inventors have applied the technique related to compensation of optically rotatory power as disclosed in the related art of JP-A-2005-158121 or JP-A-2010-134414 which focuses on the influence of the optically rotatory power on the phase difference. The present inventors have studied a polarization converting element capable of creating an optical effect such that the polarization plane of an incident P-polarized light beam is rotated by 90 deg to convert the P-polarized light beam into an S-polarized light beam and output the S-polarized light beam.

First, an application in which the technique proposed in JP-A-2005-158121 or JP-A-2010-134414 is applied to the optical design of a quartz crystal ½-wavelength plate which is disposed at an inclination angle of 45 deg so as to be inserted in the stacking interface of a prism array (a polarization beam splitter array) disclosed in JP-A-2009-128568 or JP-A-2009-244520 will be considered based on FIG. 20.

In this case, the transparent substrates interposing the quartz crystal ½-wavelength plate are formed of a general glass, and the refractive index n1 of the glass is 1.53, and the refractive index n2 of the quartz crystal is 1.54. Thus, light passes through the polarization converting element substantially with no change of the optical path (optical axis) of light passing through the prism array. That is, refraction occurs scarcely at the interface between the glass and the quartz crystal ½-wavelength plate when light is incident to the quartz crystal ½-wavelength plate and at the interface between the quartz crystal ½-wavelength plate and the glass when light exits from the quartz crystal ½-wavelength plate.

In FIG. 20, when the optical axis azimuth seen from the normal PL of the principal surface (incidence or exit surface) of the quartz crystal ½-wavelength plate WP is $\theta_0$, and the optical axis azimuth with respect to the light beam R1 advancing in the quartz crystal ½-wavelength plate WP is $\theta_1$, and the angle between the normal PL of the principal surface of the quartz crystal ½-wavelength plate WP and the light beam R1 is $\theta_2$, these angles satisfy the following relation.

$$\theta_0 = a\tan(\tan\theta_1 \times \cos\theta_2) \quad (A1)$$

In this case, since $\theta_1 = 45$ deg, and $\theta_2 = 45$ deg, $\theta_0$ is calculated as follows.

$$\theta_0 = \mathrm{atan}(\tan(45deg) \times \cos(45deg))$$
$$= \mathrm{atan}(1/2^{1/2})$$
$$= 35.3 deg$$

However, in the polarization converting element in which a quartz crystal ½-wavelength plate is disposed to be inclined at 45 deg, a polarization separating portion made up of a wire grid polarizer, a dielectric multi-layer film, and the like is disposed on the incidence surface side to function as a polarization beam splitter, and reflecting portions are alternately disposed in parallel to the ½-wavelength plate at an inclination angle of 45 deg as proposed in JP-A-2004-029168, the quartz crystal ½-wavelength plate is not interposed by glass plates but air is in contact with the quartz crystal ½-wavelength plate. That is, since the refractive index n0 of air is 1.00, and the refractive index n2 of quartz crystal is 1.54, the optical path (optical axis) of light passing through the polarization converting element is changed. This is because refraction occurs at the interface between the air and the quartz crystal ½-wavelength plate when light is incident to the quartz crystal ½-wavelength plate and the interface between the quartz crystal ½-wavelength plate and the air when light exits from the quartz crystal ½-wavelength plate.

$$\theta_0 = a\tan(\tan\theta_1 \times \cos\theta_2) \quad (A1)$$

In this case, since $\theta_1 = 45$ deg, and $\theta_2 = 27.2$ deg, $\theta_0$ is calculated as follows.

$$\theta_0 = \mathrm{atan}(\tan(45deg) \times \cos(27.2deg))$$
$$= \mathrm{atan}(1 \times 0.88941)$$
$$= 41.65 deg$$

The optical design of the quartz crystal ½-wavelength plate when the quartz crystal ½-wavelength plate is inclined at 45 deg and is in contact with the air, so that the optical axis of incident light is refracted at the interface between the air and the incidence and exit surfaces of the quartz crystal ½-wavelength plate was examined. The examined design specifications are as follows.

Design wavelength: 520 nm
Design phase difference: 460.11 deg
Optical axis azimuth: 41.65 deg
Cutting angle: 90 deg The cutting angle is defined as the angle between the crystal optical axis and the normal of the principal surface of the quartz crystal ½-wavelength plate. The design phase difference is defined as a phase difference when light having a design wavelength λ is incident from a direction parallel to the normal of the principal surface of the quartz crystal ½-wavelength plate. The optical axis azimuth angle ($\theta_0$) is defined as the angle between the crystal optical axis and the polarization plane of a linearly polarized light beam of the incident light as seen from the normal of the principal surface (incidence or exit surface) of the quartz crystal ½-wavelength plate. The relation between the wavelength of the quartz crystal ½-wavelength plate and the polarization conversion efficiency is illustrated as design values in the graph of FIG. 21.

When the distance of the optical path inside the quartz crystal ½-wavelength plate is t1, a phase difference Γ of the light passing through the quartz crystal ½-wavelength plate through the optical path is calculated by the following relational expression.

$$\Gamma 1 = 2\pi/\lambda \times (ne-no) \times t1$$

In this expression, the length t1 of the optical path is determined so that Γ1=180 deg. Moreover, the thickness "to" in the normal direction of the principal surface of the quartz crystal ½-wavelength plate is determined, and the phase difference Γo at the design wavelength λ in the normal direction is calculated.

$$\Gamma o = 2\pi/\lambda \times (ne-no) \times to$$

$$\cos(\theta_2) = to/t1$$

$$to = t1 \times \cos(\theta_2)$$

$$\Gamma o = 2\pi/\lambda \times (ne-no) \times t1 \times \cos(\theta_2)$$

Γo is defined as a design phase difference, and in this example, Γo=160.11 (deg).

However, the quartz crystal ½-wavelength plate is manufactured by fragmenting a wafer obtained by cutting a quartz crystal Lambert obtained by shaping (Lambert processing) a quartz crystal ore at a predetermined cutting angle serving as a design value using a wire saw or the like.

However, in the manufacturing steps, when the wafer is cut from the quartz crystal Lambert at a cutting angle deviated from the design value or out of an allowable range, and the wafer is processed to the design plate thickness "to" described above, a deviation may occur in the design phase difference Γ0 as shown in Table 1. That is, Γo≠160.11 deg. Therefore, there is a problem in that all of the quartz crystal ½-wavelength plates become defective products.

TABLE 1

|  | Design value | Angular Error |
|---|---|---|
| Design wavelength (nm) | 520 | 520 |
| Design phase difference (deg) | 160.11 | 175.50 |
| Optical axis azimuth (deg) | 41.65 | 41.65 |
| Cutting angle (deg) | 90 | 80 |

When the cutting angle is deviated to 80 deg from the design value of 90 deg, if the wafer is processed to the design plate thickness "to" without taking the angular deviation into consideration, the design phase difference Γo will be greatly deviated to 175.50 deg from the design phase difference of 160.11 deg.

This is because the extraordinary refractive index ne and the ordinary refractive index no in the expression of Γo=2π/λ×(ne−no)× to depend on the cutting angle, and these values are changed with the cutting angle. Therefore, the phase difference Γ of light having passed the distance t1 of the optical path inside the quartz crystal ½-wavelength plate disposed at an inclination angle of 45 deg is greatly deviated from 180 deg.

As a result, the polarization conversion efficiency changes greatly as shown in FIG. 21. Therefore, there is a problem in that the polarization conversion efficiency at wavelengths of 550 nm or shorter decreases greatly and deteriorates.

SUMMARY

An advantage of some aspects of the invention is to realize a polarization converting element, a polarization converting unit, and a projection-type imaging device including a ½-wavelength plate capable of re-adjusting a design phase difference by adjusting a plate thickness to an optimum design plate thickness in accordance with an angular deviation even when the cutting angle of a crystal material such as a quartz crystal having birefringent properties and optically rotatory power is deviated from a design value, and reliably obtaining polarization conversion efficiency of a defined value or higher in a predetermined wavelength region.

Application Example 1

This application example is directed to a polarization converting element including a translucent substrate disposed at a predetermined angle with respect to an incident light; a polarization separating portion disposed on an incidence-side surface of the translucent substrate so as to separate the incident light into a first linearly polarized light beam and a second linearly polarized light beam orthogonal to each other and transmit the first linearly polarized light beam and reflect the second linearly polarized light beam; and a reflecting element disposed to be separated approximately in parallel to the translucent substrate so as to reflect the second linearly polarized light beam reflected by the polarization separating portion, wherein the translucent substrate is a retardation element which is formed of an inorganic crystal material having birefringent properties and optically rotatory power and which is configured to convert the first linearly polarized light beam having passed through the polarization separating portion and having been incident to the translucent substrate so as to be parallel to a polarization plane of the second linearly polarized light beam so that the first linearly polarized light beam is output as a second linearly polarized light beam, and wherein the retardation element satisfies one of the following conditions (A), (B), and (C):

Condition (A)

the translucent substrate is made up of a single plate, and when a design wavelength is "λ," a plate thickness of the translucent substrate is "to," and a cutting angle of the inorganic crystal material is "Z," the relation between the design wavelength "λ," the cutting angle "Z," and the plate thickness "to" satisfies the following expressions (1), (2), (3), and (4):

$$\lambda \leq -0.1293 \times Z^2 + 22.402 \times Z - 325.73 \quad (1)$$

$$\lambda \geq 0.1199 \times Z^2 - 20.762 \times Z + 1348.6 \quad (2)$$

$$to \leq 5E\text{-}06 \times Z^2 - 0.0004 \times Z - 0.0368 \quad (3)$$

$$to \geq 2E\text{-}05 \times Z^2 - 0.0029 \times Z + 0.136 \quad (4)$$

Condition (B)

the translucent substrate is formed by stacking two inorganic crystal materials, and when a design wavelength is "λ," a plate thickness of the translucent substrate is "to," and a cutting angle of the inorganic crystal material is "Z," the relation between the design wavelength "λ," the cutting angle "Z," and the plate thickness "to" satisfies the following expressions (5), (6), (7), (8), and (9):

$$\lambda \leq -10.75 \times Z^2 + 1933.9 \times Z - 86330 \quad (5)$$

$$\lambda \geq 6.25 \times Z^2 - 1126.6 \times Z + 51216 \quad (6)$$

$$to \leq -0.0281 \times Z^2 + 5.0512 \times Z - 225.61 \quad (7)$$

$$to \geq 0.0173 \times Z^2 - 3.1146 \times Z + 141.39 \quad (8)$$

when a phase difference of a first inorganic crystal material among the two inorganic crystal materials in an advancing direction of a light beam advancing in the translucent substrate is Γ1, and a phase difference of a second inorganic crystal material is Γ2, the following expression is satisfied:

$$|\Gamma 1 - \Gamma 2| = 180(\text{deg}) \quad (9)$$

Condition (C)

the translucent substrate is formed by stacking two inorganic crystal materials, and when a design wavelength is "λ," a plate thickness of the translucent substrate is "to," and a cutting angle of the inorganic crystal material is "Z," the relation between the design wavelength "λ," the cutting angle "Z," and the plate thickness "to" satisfies the following expressions (10), (11), (12), and (13):

$$\lambda \leq -2E\text{-}07 \times Z^6 + 0.0001 \times Z^5 - 0.024 \times Z^4 + 2.7749 \times Z^3 - 178.61 \times Z^2 + 6067.8 \times Z - 84312 \quad (10)$$

$$\lambda \geq -4E\text{-}05 \times Z^3 + 0.0757 \times Z^2 - 10.073 \times Z + 696.9 \quad (11)$$

$$to \leq -2E\text{-}08 \times Z^4 + 6E\text{-}06 \times Z^3 - 0.0008 \times Z^2 + 0.0495 \times Z - 0.9844 \quad (12)$$

$$to \geq 5E\text{-}07 \times Z^3 - 0.0001 \times Z^2 + 0.0065 \times Z - 0.0924 \quad (13).$$

In this application example having this configuration, since the polarization separating element, in which the polarization separating portion formed of a dielectric multi-layer film is provided in the translucent substrate, and the reflecting element form an array, a transparent member such as a glass provided therebetween is unnecessary, and a compact structure is achieved.

Moreover, since a crystal material having a higher heat conductivity than a glass is used as the translucent substrate, a better heat-dissipation effect than the related art is obtained, and heat resistance and long service life can be achieved.

Moreover, since the crystal material has birefringent properties and optically rotatory power, there is a problem in that a vibration plane of a linearly polarized light beam propagating in an optical axis direction may be distorted with respect to the advancing direction of light, and the polarization state thereof may change so that the polarization conversion efficiency may decrease. In this application example, the relation between the design wavelength "λ," the cutting angle "Z," and the plate thickness "to" satisfies one of Conditions (A), (B), and (C). Therefore, the first linearly polarized light beam having passed through the polarization separating portion and been incident to the translucent substrate exits from an exit-side surface of the translucent substrate as the second linearly polarized light beam orthogonal to the polarization plane of the first linearly polarized light beam. Accordingly, high polarization conversion efficiency is obtained.

Application Example 2

This application example is directed to the polarization converting element according to the above application example, wherein when Condition (A) is satisfied, and an optical axis azimuth seen from a normal of the translucent substrate is $\theta_0$, an optical axis azimuth with respect to a light beam advancing in the translucent substrate is $\theta_1$, the angle between the light beam and the normal of a crystal optical axis is $\theta_2$, the refractive index of the translucent substrate is $n_c$, the refractive index of a layer adjacent to the translucent substrate is $n_a$, and an incidence angle is $\alpha$, the following expressions (A1) and (A2) are satisfied.

$$\theta_0 = a\tan(\tan\theta_1 \times \cos\theta_2) \quad (A1)$$

$$n_a \sin\alpha = n_c \sin\theta_2 \quad (A2)$$

In this application example having this configuration, when the translucent substrate is made up of a single plate, it is possible to provide a polarization converting element having favorable conversion efficiency easily.

Application Example 3

This application example is directed to the polarization converting element according to the above application example, wherein when Condition (B) or (C) is satisfied, and an optical axis azimuth of the first inorganic crystal material seen from a normal of the translucent substrate is $\theta_{01}$, an optical axis azimuth with respect to a light beam advancing in the first inorganic crystal material is $\theta_{11}$, the angle between the light beam and the normal of a crystal optical axis is $\theta_{21}$, the refractive index of the first inorganic crystal material is $n_{c1}$, the refractive index of a layer adjacent to the first inorganic crystal material is $n_a$, and an incidence angle is $\alpha$, the following expressions (A11) and (A21) are satisfied:

$$\theta_{01} = a\tan(\tan\theta_{11} \times \cos\theta_{21}) \quad (A11)$$

$$n_a \sin\alpha = n_{c1} \sin\theta_{21} \quad (A21),$$

when an optical axis azimuth of the second inorganic crystal material seen from a normal of the translucent substrate is $\theta_{02}$, an optical axis azimuth with respect to a light beam advancing in the second inorganic crystal material is $\theta_{12}$, the angle between the light beam and the normal of a crystal optical axis is $\theta_{22}$, the refractive index of the second inorganic crystal material is $n_{c2}$, and the refractive index of the first inorganic crystal material adjacent to the second inorganic crystal material is $n_{c1}$, the following expressions (A12) and (A22) are satisfied:

$$\theta_{02} = a\tan(\tan\theta_{12} \times \cos\theta_{22}) \quad (A12)$$

$$n_{c1} \sin\theta_{21} = n_{c2} \sin\theta_{22} \quad (A22).$$

In this application example having this configuration, when the translucent substrate is made up of two inorganic crystal materials, it is possible to provide a polarization converting element having favorable conversion efficiency easily.

Application Example 4

This application example is directed to the polarization converting element according to the above application example, wherein the incidence angle α is about 45 deg or 135 deg.

In this application example having this configuration, since the polarization separating portion can reflect the second linearly polarized light beam toward the reflecting element approximately at a right angle with respect to the incident light, a light beam reflected by the reflecting element can be reflected in a direction approximately parallel to the optical path of the second linearly polarized light beam output from the translucent substrate.

Application Example 5

This application example is directed to the polarization converting element according to the above application example, wherein the crystal material is a quartz crystal.

In this application example having this configuration, since a quartz crystal which can be obtained at a low cost as compared to other crystal materials such as a sapphire is used as the crystal material, it is possible to provide the polarization converting element at a low cost.

Application Example 6

This application example is directed to the polarization converting element according to the above application example, wherein the reflecting element includes a quartz crystal plate and a mirror portion formed on a surface of the quartz crystal plate.

In this application example having this configuration, a plate member where the mirror portion is formed is a quartz crystal rather than a glass, a heat-dissipation effect increases in the reflecting element as well as the translucent substrate, and it is possible to achieve better heat resistance and longer service life.

Application Example 7

This application example is directed to a polarization converting unit including the polarization converting element having the above-described configuration; and a holding member that holds the polarization converting element, wherein the holding member includes a pair of holding plates that holds both ends of the translucent substrate and both ends of the reflecting element, respectively, and a pair of connecting plates that connects both ends of the pair of holding plates, respectively.

In this application example having this configuration, since the polarization separating element, which includes the translucent substrate and the polarization separating portion, and the reflecting element can be accommodated in such a compact holding member, satisfactory handling convenience is provided.

Application Example 8

This application example is directed to the polarization converting unit according to the above application example, wherein the pair of holding plates and the pair of connecting plates are formed to be integrated with each other, guide grooves for guiding the translucent substrate and the reflecting element, respectively, are formed in portions of the pair of holding plates facing each other, and the guide grooves are opened to one set of side surfaces of the pair of holding plates, respectively.

In this application example having this configuration, since the polarization converting unit can be assembled just by inserting the polarization separating element and the reflecting element along the guide grooves, the assembly work is made easy.

Application Example 9

This application example is directed to the polarization converting unit according to the above application example, wherein the pair of holding plates and the pair of connecting plates are formed to be separated from each other, and the pair of connecting plates includes engaging pieces that bias the pair of holding plates in such a direction as to face each other.

In this application example having this configuration, since the pair of holding members is biased in a mutually approaching direction by the pair of connecting plates, the polarization separating element and the reflecting element can be reliably held. Accordingly, it is possible to prevent the polarization separating element and the reflecting element from dropping off the polarization separating unit.

Application Example 10

This application example is directed to a projection-type imaging device including a light source; a polarization converting element that converts light from the light source into the second linearly polarized light beam and outputs the second linearly polarized light beam; an optical modulation unit that modulates the light output from the polarization converting element in accordance with image information to be projected; and a projection optical system that projects the light modulated by the optical modulation unit, wherein the polarization converting element is the polarization converting element having the above-described configuration.

In this application example having this configuration, since the polarization conversion efficiency of the polarization converting element is high, it is possible to provide a projection-type imaging device having high projection accuracy.

Application Example 11

This application example is directed to the projection-type imaging device according to the above application example, wherein the optical modulation unit is a liquid crystal panel.

In this application example having this configuration, it is possible to provide a liquid crystal projector having the above-described advantages.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
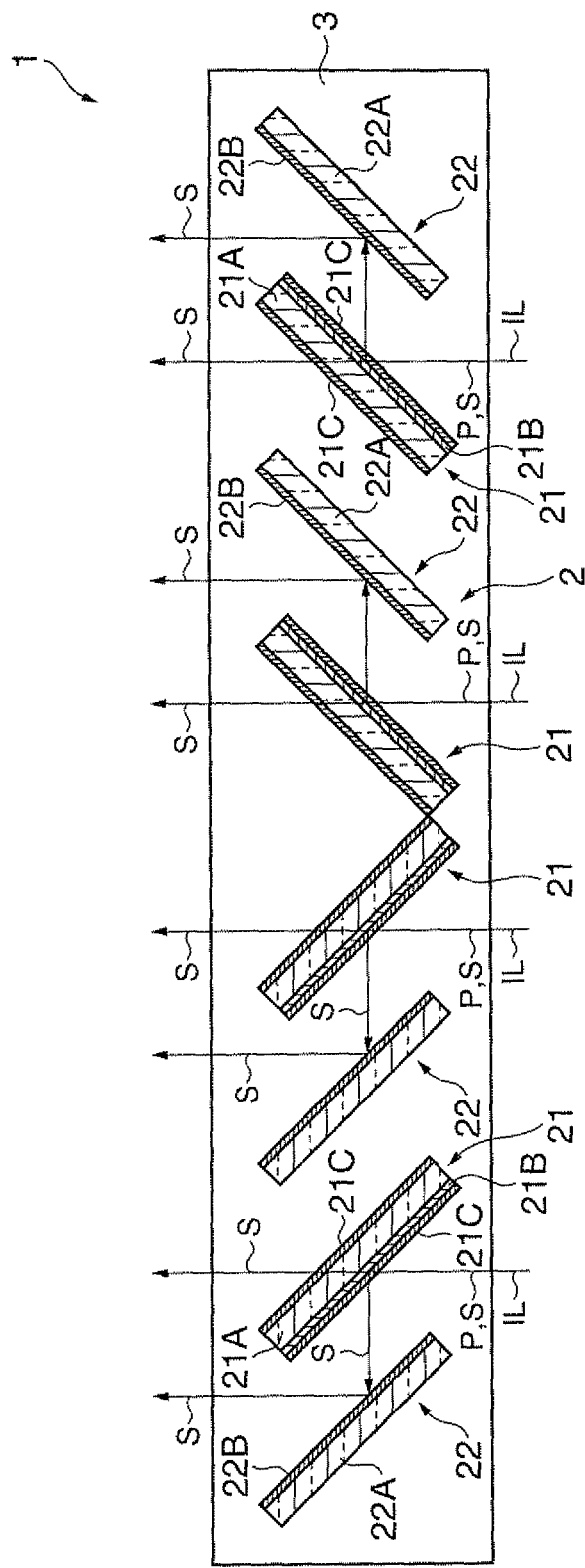
FIG. 1 is a schematic view of a polarization converting element according to a first embodiment of the invention.

Exemplary embodiments of the invention will be described based on the drawings. In the respective exemplary embodiments, the same constituent components will be denoted by the same reference numerals, and description thereof will be omitted or simplified.

FIGS. 1 to 4 show the first embodiment.

FIG. 1 shows an outline of the first embodiment.

In FIG. 1, a polarization converting unit 1 of the first embodiment includes a polarization converting element 2 and a holding member 3 for holding the polarization converting element 2. The holding member 3 is a flat and rectangular plate member formed of a synthetic resin, for example.

The polarization converting element 2 includes a polarization separating element 21 and a reflecting element 22 which are arranged alternately. One set of ends of the polarization separating element 21 and the reflecting element 22 are fitted to recess portions (not shown) of the holding member 3, respectively.

In FIG. 1, a plurality of (for example, two) polarization separating elements 21 and a plurality of (for example, two) reflecting elements 22 are disposed on the left and right sides in relation to the center of the holding member 3. The polarization separating elements 21 and the reflecting elements 22 disposed on the left side of the center and the polarization separating elements 21 and the reflecting elements 22 disposed on the right side are disposed in a symmetrical relation.

The polarization separating element 21 includes one translucent substrate 21A disposed so that the incidence-side principal surface and exit-side principal surface thereof are at a predetermined angle (about 45 deg in the present embodiment) with respect to an incident light IL. The polarization separating element 21 also includes a polarization separating portion 21B that is disposed on an incidence-side surface of the translucent substrate 21A so as to separate the incident light IL into a P-polarized light beam P which is a first linearly polarized light beam and an S-polarized light beam S which is a second linearly polarized light beam, which are orthogonal to each other, and transmit the P-polarized light beam P and reflect the S-polarized light beam S. The polarization separating element 21 also includes anti-reflection portions 21C formed on respective principal surfaces (exit-side principal surfaces) on a side opposite to a principal surface of the translucent substrate 21A on which the polarization separating portion 21B is disposed and the incident light IL is incident.

The translucent substrate 21A is a ½-wavelength plate formed of a quartz crystal having birefringent properties and optically rotatory power. The translucent substrate 21A is configured to convert the incident P-polarized light beam P having passed through the polarization separating portion 21B so as to be parallel to a polarization plane of the S-polarized light beam S reflected from the reflecting element 22 so that the P-polarized light beam P is output as the S-polarized light beam S.

The polarization separating portion 21B is formed of a dielectric multi-layer film in which a low refractive index layer formed of a silicon oxide ($SiO_2$), for example, and a high refractive index layer formed of an oxidized alumina ($Al_2O_3$), for example, are formed in a predetermined order and a predetermined optical thickness so as to be optically uniform within a plane.

The anti-reflection portion 21C is formed by depositing a substance such as a dielectric multi-layer film obtained by sequentially and alternately stacking a silicon dioxide and a titanium oxide, for example.

The reflecting element 22 includes a quartz crystal plate 22A and a mirror portion 22B formed on a surface of the quartz crystal plate 22A.

The mirror portion 22B is formed of a multi-layer film formed by depositing a substance such as a silicon dioxide, a titanium oxide, and the like, for example.

Figure 2:
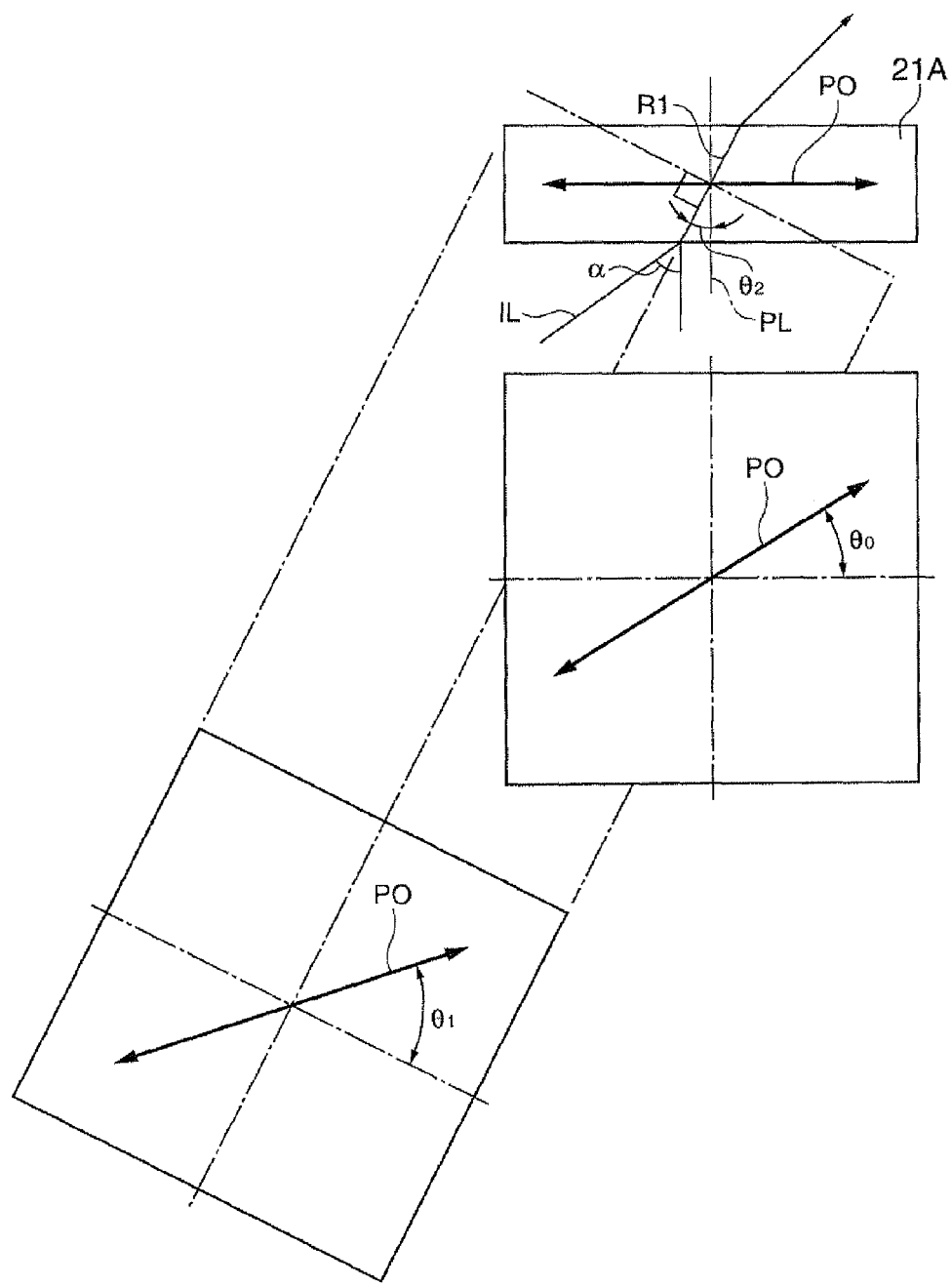
FIG. 2 is a diagram illustrating an optical axis azimuth of a translucent substrate of the first embodiment.

FIG. 2 is a diagram illustrating an optical axis azimuth of a ½-wavelength plate.

In FIG. 2, when an optical axis azimuth seen from a normal of the translucent substrate 21A which is a ½-wavelength plate is $\theta_0$, an optical axis azimuth with respect to a light beam R1 advancing in the translucent substrate 21A is $\theta_1$, and an angle between a normal PL of a crystal optical axis PO and the light beam R1 is $\theta_2$, these angles satisfy the following relation.

$$\theta_0 = a\tan(\tan\theta_1 \times \cos\theta_2) \tag{A1}$$

Moreover, when the refractive index of the translucent substrate 21A is $n_c$, a layer adjacent to the translucent substrate 21A is an air layer, and the refractive index of the air is $n_a$, since the refraction angle in the translucent substrate 21A is $\theta_2$, the following relation is satisfied by Snell's law.

$$n_a \sin\alpha = n_c \sin\theta_2 \tag{A2}$$

In the present embodiment, since the refractive index $n_c$ of a quartz crystal which is an inorganic crystal material of the translucent substrate 21A is 1.54, the refractive index $n_a$ of air is 1.00, and the incidence angle $\alpha$ is 45 deg, $\theta_2$ is 27.2 deg from the expression (A2).

Furthermore, since $\theta_2$ is 27.2 deg, and $\theta_1$ is 45 deg, $\theta_0$ is calculated from the expression (A1) as follows.

$$\theta_0 = \mathrm{atan}(\tan(45) \times \cos(27.2)) = 41.650$$
$$= 41.7(deg)$$

In the present embodiment, the translucent substrate 21A is an A-type retardation plate which is made up of a single plate, and polarization conversion efficiency is analyzed by simulation when the incidence angle to the translucent substrate 21A is tilted by a step of 5 (deg) within a range of ±10 (deg) about 45 (deg). The polarization conversion efficiency in a predetermined wavelength region is averaged by the wavelength region, and the transmission loss in the averaged polarization conversion efficiency is evaluated by average. The transmission characteristics when the polarization converting element according to the present embodiment is mounted on a projection-type imaging device are set to satisfy the following specifications.

M: Transmission loss is within 10% for wavelengths of 500 to 600 nm

N: Transmission loss is within 20% for wavelengths of 400 to 700 nm

Design conditions are set so as to satisfy these two specifications M and N.

In the A-type retardation plate, the following condition (A) is satisfied.

Condition (A)

When a design wavelength is "λ," a plate thickness of the translucent substrate 21A is "to," and a cutting angle of an inorganic crystal material constituting the translucent substrate 21A is "Z," the relation between the design wavelength "λ," the cutting angle "Z," and the plate thickness "to" satisfies the following expressions (1), (2), (3), and (4).

$$\lambda \leq -0.1293 \times Z^2 + 22.402 \times Z - 325.73 \tag{1}$$

$$\lambda \geq 0.1199 \times Z^2 - 20.762 \times Z + 1348.6 \tag{2}$$

$$to \leq 5E\text{-}06 \times Z^2 - 0.0004 \times Z - 0.0368 \quad (3)$$

$$to \geq 2E\text{-}05 \times Z^2 - 0.0029 \times Z + 0.136 \quad (4)$$

The expressions (1) and (2) represent the relation between the design wavelength "λ" and the cutting angle "Z," and among these, the expression (1) is a relational expression of an upper limit, and the expression (2) is a relational expression of a lower limit. Moreover, the expressions (3) and (4) represent the relation between the cutting angle "Z" and the plate thickness "to," and among these, the expression (3) is a relational expression of an upper limit, and the expression (4) is a relational expression of a lower limit.

Figure 3A:
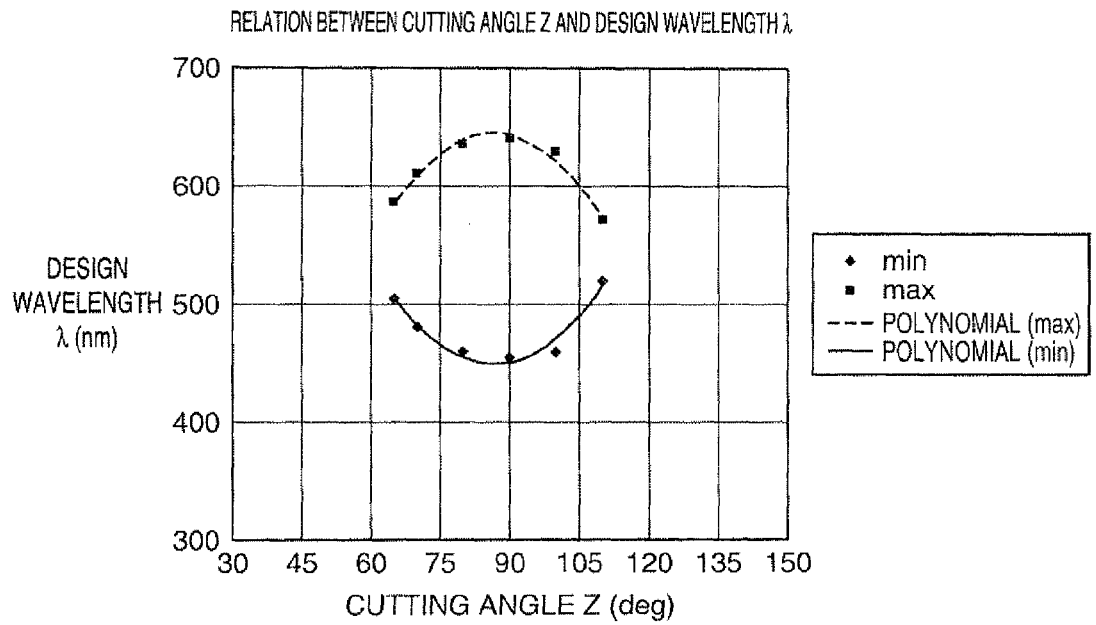
FIG. 3A is a graph showing a relation between a cutting angle "Z" and a design wavelength "λ.
Figure 3B:
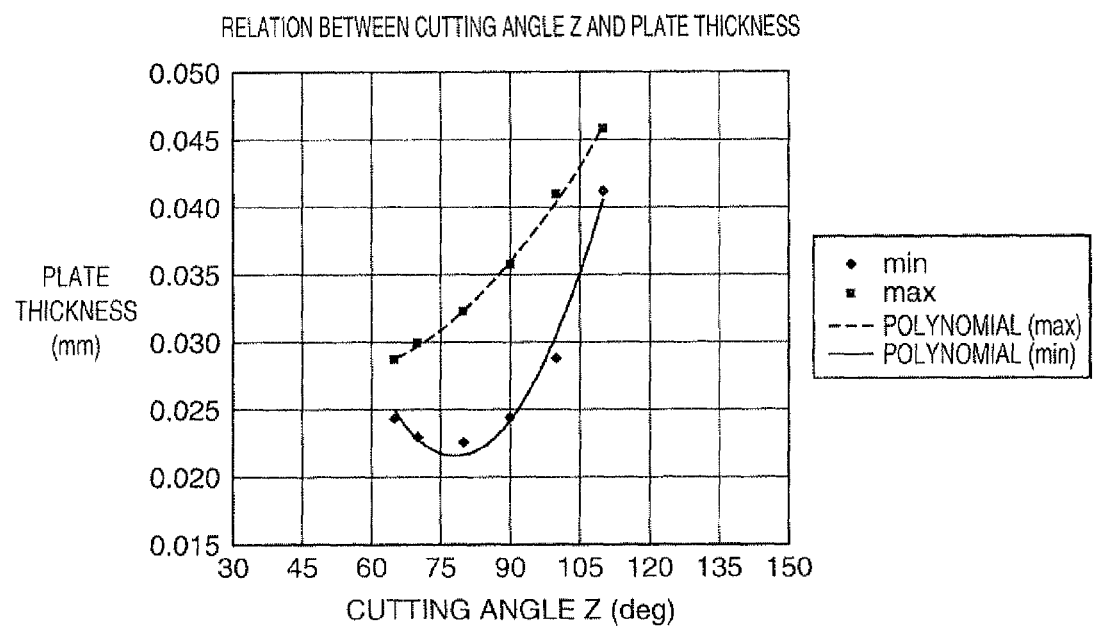
" and FIG. 3B is a graph showing a relation between a cutting angle "Z" and a plate thickness "to."

Table 2 shows the analysis results based on simulation of polarization conversion efficiency, in which the relation between the cutting angle "Z" and the design wavelength "λ" and the relation between the cutting angle "Z" and the plate thickness "to" are illustrated. The relation between the cutting angle "Z" and the design wavelength "λ" is also illustrated in FIG. 3A, and the relation between the cutting angle "Z" and the plate thickness "to" is also illustrated in FIG. 3B.

TABLE 2

|  |  | Cutting angle Z (deg) | | | | | | | |
|---|---|---|---|---|---|---|---|---|---|
|  |  | 115 | 110 | 100 | 90 | 80 | 70 | 65 | 60 |
| Design wavelength λ (nm) | Min | NG | 520 | 460 | 455 | 460 | 480 | 505 | NG |
|  | Max | NG | 570 | 630 | 640 | 635 | 610 | 585 | NG |
| Plate thickness to (mm) | Min | NG | 0.041 | 0.029 | 0.024 | 0.023 | 0.023 | 0.024 | NG |
|  | Max | NG | 0.046 | 0.041 | 0.036 | 0.032 | 0.030 | 0.029 | NG |

From Table 2 and FIGS. 3A and 3B, the range of the design wavelength "λ" and the cutting angle "Z" for satisfying the transmission characteristics is as follows.

$$455 \leq \lambda \leq 640 (\text{nm})$$

$$65 \leq Z \leq 110 (\text{deg})$$

Figure 4:
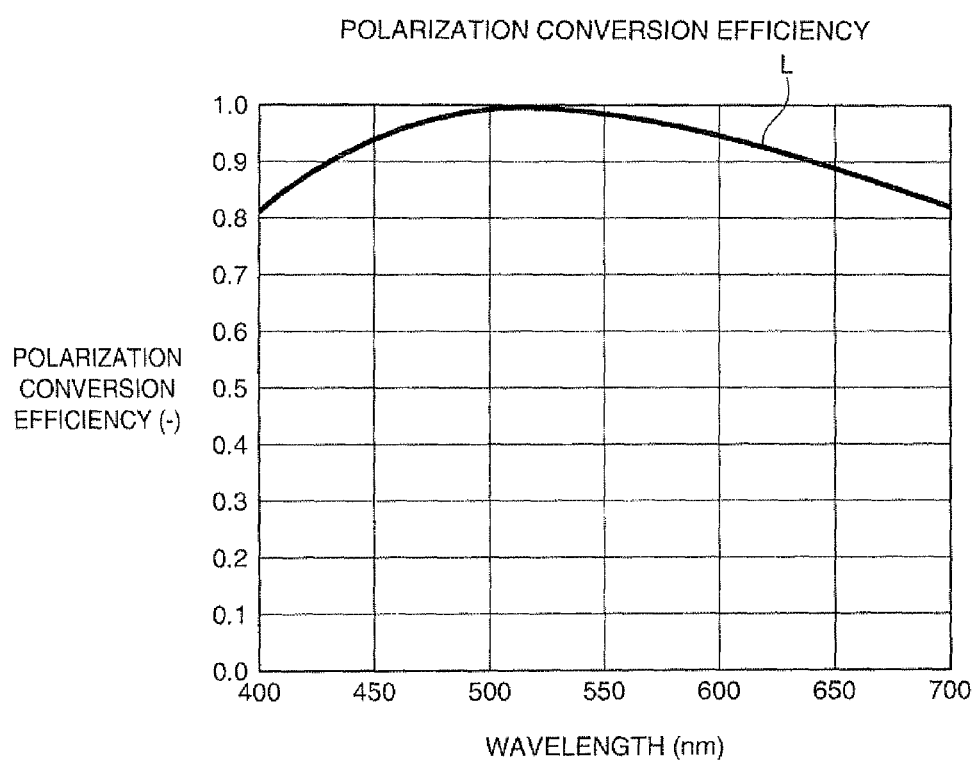
FIG. 4 is a graph showing polarization conversion efficiency of the translucent substrate of the first embodiment.

When the design wavelength "λ" and the cutting angle "Z" are designed so that the relation thereof satisfies the expressions (3) and (4) which are the relational expressions of the upper and lower limits, respectively, the specifications M and N of the above-described transmission characteristics (transmission loss) can be satisfied as shown in FIG. 4, for example.

FIG. 4 shows polarization conversion efficiency of the translucent substrate 21A which is a ½-wavelength plate designed in the present embodiment. In FIG. 4, a plurality of data is displayed so as to overlap with a curve L depicted by a bold line.

As shown in FIG. 4, the polarization conversion efficiency is equal to or greater than 0.8 for wavelengths of 400 nm to 700 nm, and the average of transmission loss is within 20%. The polarization conversion efficiency exhibits a high value of 0.9 or more for wavelengths of 500 nm to 600 nm. The specification that the transmission loss is within 10% can be sufficiently satisfied.

In the first embodiment having the above configuration, the following advantages can be obtained.

(1) The polarization separating element 21 is configured to include the translucent substrate 21A formed of a crystal material having birefringent properties and optically rotatory power and the polarization separating portion 21B formed on the incidence-side surface of the translucent substrate 21A so as to transmit a P-polarized light beam and reflect an S-polarized light beam. The reflecting element 22 that reflects the S-polarized light beam S reflected by the polarization separating portion 21B is disposed so as to be separated approximately in parallel to the translucent substrate 21A. The P-polarized light beam P having passed through the polarization separating portion 21B and been incident to the translucent substrate 21A is converted so as to be parallel to the polarization plane of the S-polarized light beam S so that the P-polarized light beam P is output as an S-polarized light beam S. Therefore, since the polarization separating element 21 and the reflecting element 22 form a lens array, a transparent member such as a glass provided therebetween is unnecessary, and a compact structure is achieved.

(2) Since a crystal material is used as the translucent substrate 21A, and the crystal material has a better heat-dissipation effect than glass, it is possible to achieve heat resistance and long service life. In addition, in the present embodiment, since an inorganic crystal material having birefringent properties and optically rotatory power is used as the translucent substrate 21A, there is a problem in that the polarization state changes so that the polarization conversion efficiency decreases. However, the condition (A), that is, the relation between the design wavelength "λ," the cutting angle "Z," and the plate thickness "to," for allowing the P-polarized light beam P having passed through the polarization separating portion 21B and been incident to the translucent substrate 21A to exit from an exit-side surface of the translucent substrate 21A while maintaining the polarization plane is set so as to satisfy the following relations.

$$\lambda \leq -0.1293 \times Z^2 + 22.402 \times Z - 325.73 \quad (1)$$

$$\lambda \geq 0.1199 \times Z^2 - 20.762 \times Z + 1348.6 \quad (2)$$

$$to \leq 5E\text{-}06 \times Z^2 - 0.0004 \times Z - 0.0368 \quad (3)$$

$$to \geq 2E\text{-}05 \times Z^2 - 0.0029 \times Z + 0.136 \quad (4)$$

Therefore, it is possible to eliminate a change of the polarization state and to obtain favorable optical characteristics.

(3) When one polarization separating element 21 includes one translucent substrate 21A, and an optical axis azimuth seen from a normal of the translucent substrate 21A is $\theta_0$, an optical axis azimuth with respect to a light beam advancing in the translucent substrate 21A is $\theta_1$, the angle between the light beam and a normal PL of a crystal optical axis PO is $\theta_2$, the refractive index of the translucent substrate 21A is $n_c$, the refractive index of an air layer adjacent to the translucent substrate 21A is $n_a$, the optical axis azimuth $\theta_0$ is calculated from the expressions.

$$\theta_0 = a\tan(\tan\theta_1 \times \cos\theta_2) \quad (A1)$$

$$n_a \sin\alpha = n_c \sin\theta_2 \quad (A2)$$

Therefore, when one polarization separating element 21 includes one translucent substrate 21A, it is possible to provide the polarization converting element 2 having favorable conversion efficiency easily.

(4) Since the translucent substrate 21A is disposed at 45 (deg) or 135 (deg) with respect to the incident light IL, the polarization separating portion 21B of the polarization separating element 21 can reflect the S-polarized light beam S toward the reflecting element 22 approximately at a right angle with respect to the incident light. Thus, the S-polarized light beam S reflected by the reflecting element 22 can be made approximately parallel to the S-polarized light beam S output from the translucent substrate 21A. As a result, since the light reflected from the reflecting element 22 and the light transmitted by the polarization separating element 21 can be easily aligned, it is possible to assemble the polarization converting element 2 easily.

(5) Since the translucent substrate 21A is formed of a quartz crystal which can be obtained at a low cost as compared to other crystal materials such as a sapphire, it is possible to provide the polarization converting element 2 at a low cost.

(6) Since in the reflecting element 22, a plate member where the mirror portion 228 is formed is a quartz crystal rather than a glass, a heat-dissipation effect increases in the reflecting element 22 as well as the polarization separating element 21, and it is possible to achieve better heat resistance and longer service life.

(7) Since the polarization separating portion 21B is formed of a dielectric multi-layer film, it is possible to manufacture the polarization separating element 21 easily.

Next, the second embodiment of the invention will be described based on FIGS. 5 to 8.

In the second embodiment, the translucent substrate 21A is made up of two retardation plates, and the other configuration is the same as that of the first embodiment.

Figure 5:
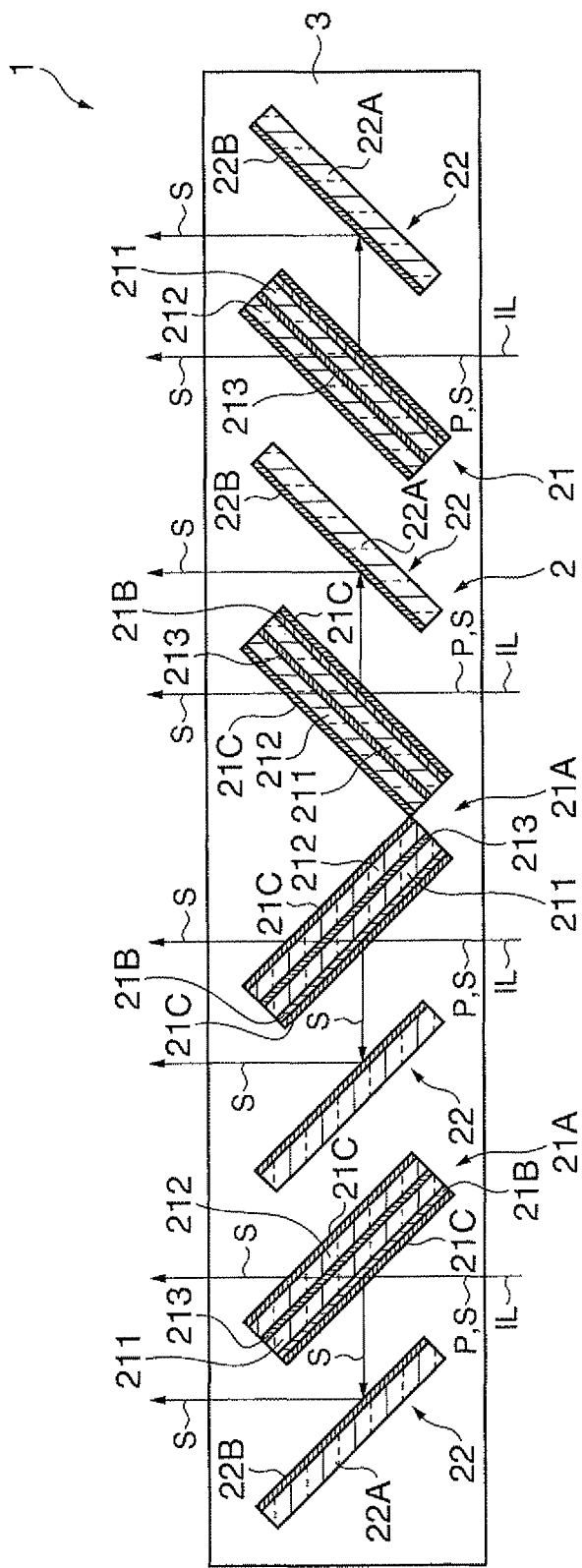
FIG. 5 is a schematic view of a polarization converting element according to a second embodiment of the invention.

FIG. 5 shows an outline of a polarization converting element according to the second embodiment of the invention.

In FIG. 5, the translucent substrate 21A includes first and second planar inorganic crystal materials 211 and 212 formed of a quartz crystal, and the anti-reflection portion 21C is formed on one surface of the first inorganic crystal material 211. The anti-reflection portion 21C is provided with the polarization separating portion 21B. One surface of the second inorganic crystal material 212 faces the other surface of the first inorganic crystal material 211, and the anti-reflection portion 21C is formed on the other surface of the second inorganic crystal material 212. FIG. 5 shows a configuration in which the first and second inorganic crystal materials 211 and 212 are bonded by a bonding layer 213. In the present embodiment, the first and second inorganic crystal materials 211 and 212 may be just stacked.

Figure 6:
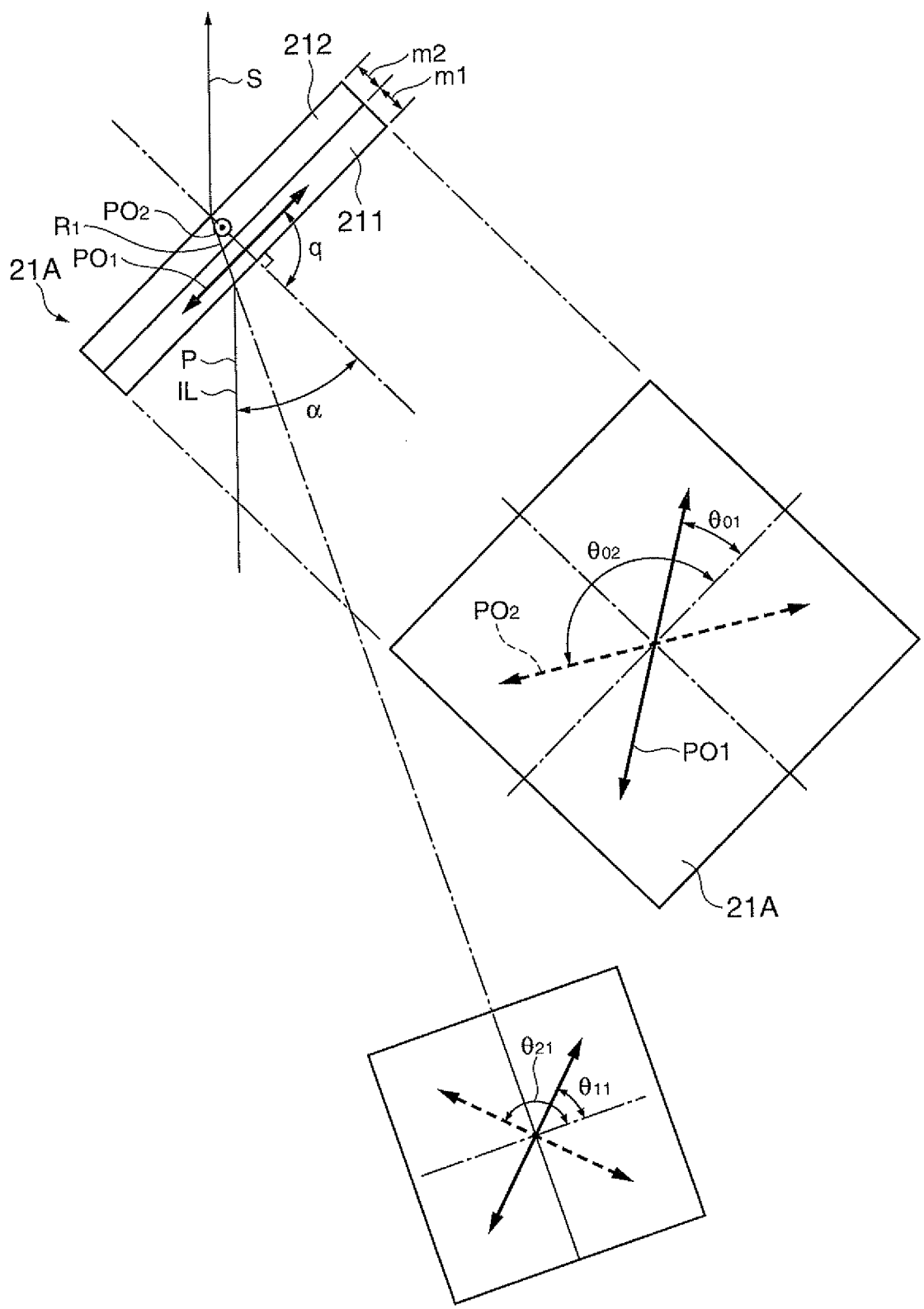
FIG. 6 is a diagram illustrating an optical axis azimuth of a translucent substrate of the second embodiment.

In the present embodiment, the optical axis azimuth of the translucent substrate 21A is shown in FIG. 6.

As shown in FIG. 6, the first and second inorganic crystal materials 211 and 212 are bonded by the bonding layer 213 so that the crystal optical axes thereof $PO_1$ and $PO_2$ cross each other. In the present embodiment, the translucent substrate 21A is a so-called D-type retardation plate which is formed by bonding the first and second inorganic crystal materials 211 and 212.

The optical axis azimuths $\theta_{01}$ and $\theta_{02}$ of the first and second inorganic crystal materials 211 and 212 are calculated from the following expressions.

That is, when an optical axis azimuth of the first inorganic crystal material 211 seen from a normal of the translucent substrate 21A is $\theta_{01}$, an optical axis azimuth with respect to a light beam R1 advancing in the first inorganic crystal material 211 is $\theta_{11}$, the angle between the light beam R1 and the normal of the crystal optical axis $PO_1$ is $\theta_{21}$ (not shown in FIG. 6), the refractive index of the first inorganic crystal material 211 is $n_{c1}$, and the refractive index of an air layer adjacent to the first inorganic crystal material 211 is $n_a$, the optical axis azimuth $\theta_{01}$ of the first inorganic crystal material 211 is calculated from the following expressions.

$$\theta_{01} = a\tan(\tan\theta_{11} \times \cos\theta_{21}) \tag{A11}$$

$$n_a \sin\alpha = n_{c1} \sin\theta_{21} \tag{A21}$$

Similarly, when an optical axis azimuth with respect to a light beam advancing in the second inorganic crystal material 212 is $\theta_{12}$, the angle between the light beam and the normal of the crystal optical axis $PO_2$ is $\theta_{22}$ (not shown in FIG. 6), the refractive index of the second inorganic crystal material 212 is $n_{c2}$, and the refractive index of the first inorganic crystal material 211 adjacent to the second inorganic crystal material 212 is $n_{c1}$, the optical axis azimuth $\theta_{02}$ of the second inorganic crystal material 212 is calculated from the following expressions.

$$\theta_{02} = a\tan(\tan\theta_{12} \times \cos\theta_{22}) \tag{A12}$$

$$n_{c1} \sin\theta_{21} = n_{c2} \sin\theta_{22} \tag{A22}$$

Here, in the present embodiment, the difference between the optical axis azimuths $\theta_{12}$ and $\theta_{11}$ is 90 deg.

The refractive indices $n_{c1}$ and $n_{c2}$ of the quartz crystals which are the materials of the first and second inorganic crystal materials 211 and 212 are 1.54, the refractive index $n_a$ of air is 1.00, and the incidence angle $\alpha$ is 45 deg. Moreover, since the optical axis azimuth $\theta_{11}$ is 45 deg, and the optical axis azimuth $\theta_{12}$ is 135 deg (45 deg+90 deg) (for example, see JP-A-58-194004 and JP-A-59-062807), the optical axis azimuths $\theta_{01}$ and $\theta_{02}$ can be calculated from the expressions (A11), (A21), (A12), and (A22).

The optical axis azimuth $\theta_{01}$ is calculated as follows.

$$n_a \sin\alpha = n_{c1} \sin\theta_{21} \tag{A21}$$

$$1.00 \times \sin 45 \text{ deg} = 1.54 \times \sin\theta_{21}$$

$$0.7071 = 1.54 \times \sin\theta_{21}$$

$$\theta_{21} = 27.32 \text{ deg}$$

$$\theta_{01} = a\tan(\tan\theta_{11} \times \cos\theta_{21})(A11)$$
$$= a\tan(\tan 45 deg \times \cos 27.32 deg)$$
$$= a\tan(0.89)$$
$$= 41.7(deg)$$

The optical axis azimuth $\theta_{02}$ is calculated as follows.

$$n_{c1} \sin\theta_{21} = n_{c2} \sin\theta_{22} \tag{A22}$$

$$1.54 \sin 27.32 \text{ deg} = 1.54 \sin\theta_{22}$$

$$\theta_{22} = 27.32 \text{ deg}$$

$$\theta_{02} = a\tan(\tan\theta_{12} \times \cos\theta_{22})(A12)$$
$$= a\tan(\tan 135 deg \times \cos 27.32 deg)$$
$$= a\tan(-0.888)$$
$$= -41.7(deg)$$

The value −41.7 deg of the optical axis azimuth $\theta_{02}$ becomes 138.3 deg when converted in compliance with FIG. 6.

In the present embodiment, similarly to the first embodiment, polarization conversion efficiency is analyzed by simulation when the incidence angle to the translucent substrate 21A is tilted by a step of 5 (deg) within a range of ±10 (deg) about 45 (deg). The polarization conversion efficiency in a predetermined wavelength region is averaged by the wavelength region, and the transmission loss in the averaged polarization conversion efficiency is evaluated by average. The transmission characteristics when the polarization converting element according to the present embodiment is mounted on a projection-type imaging device are set to satisfy the following specifications.

M: Transmission loss is within 10% for wavelengths of 500 to 600 nm

N: Transmission loss is within 20% for wavelengths of 400 to 700 nm

Design conditions are set so as to satisfy these two specifications M and N.

In the so-called D-type retardation plate of the present embodiment, the following condition (B) is satisfied.

Condition (B)

When a design wavelength is "λ," a plate thickness of the translucent substrate is "to," and a cutting angle of the inorganic crystal material is "Z," the relation between the design wavelength "λ," the cutting angle "Z," and the plate thickness "to" satisfies the following expressions (5), (6), (7), (8), and (9).

$$\lambda \leq -10.75 \times Z^2 + 1933.9 \times Z - 86330 \quad (5)$$

$$\lambda \geq 6.25 \times Z^2 - 1126.6 \times Z + 51216 \quad (6)$$

$$to \leq -0.0281 \times Z^2 + 5.0512 \times Z - 225.61 \quad (7)$$

$$to \geq 0.0173 \times Z^2 - 3.1146 \times Z + 141.39 \quad (8)$$

Here, the plate thickness "to" is defined by the plate thickness of a retardation plate obtained by bonding the first and second inorganic crystal materials 211 and 212. That is, the plate thickness "to" is a total plate thickness of the plate thicknesses t211 and t212 of the first and second inorganic crystal materials 211 and 212.

When a phase difference of the first inorganic crystal material 211 among the two inorganic crystal materials in an advancing direction of a light beam advancing in the translucent substrate 21A is Γ1, and a phase difference of the second inorganic crystal material 212 is Γ2, the following expression is satisfied.

$$|\Gamma1 - \Gamma2| = 180 (\text{deg}) \quad (9)$$

The expressions (5) and (6) represent the relation between the design wavelength "λ" and the cutting angle "Z," and among these, the expression (5) is a relational expression of an upper limit, and the expression (6) is a relational expression of a lower limit. Moreover, the expressions (7) and (8) represent the relation between the cutting angle "Z" and the plate thickness "to," and among these, the expression (7) is a relational expression of an upper limit, and the expression (8) is a relational expression of a lower limit.

Figure 7A:
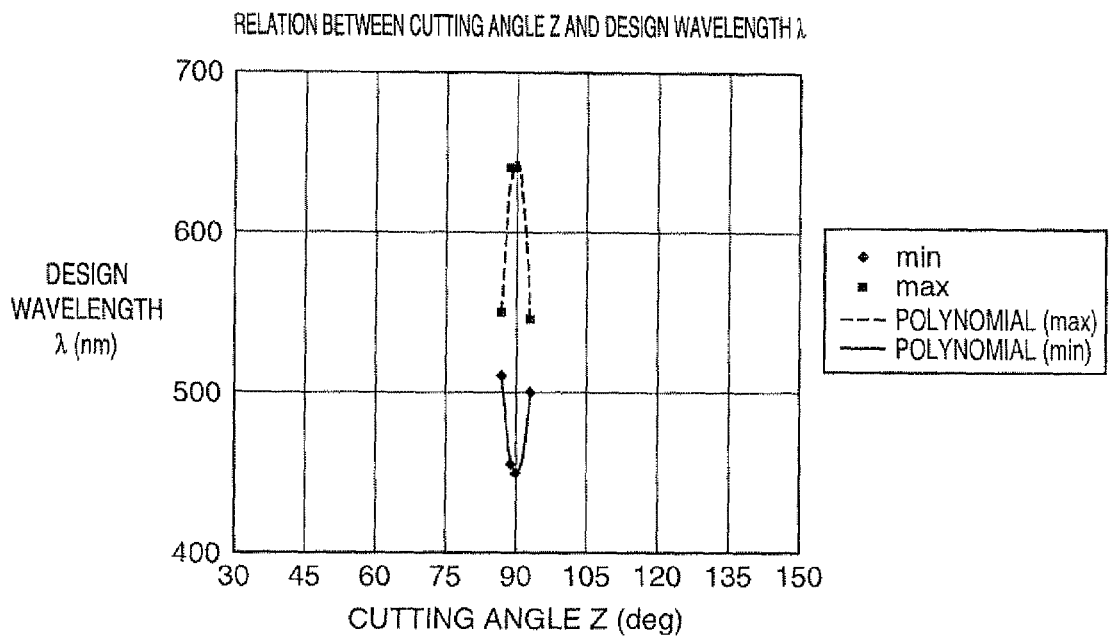
FIG. 7A is a graph showing a relation between a cutting angle "Z" and a design wavelength "λ.
Figure 7B:
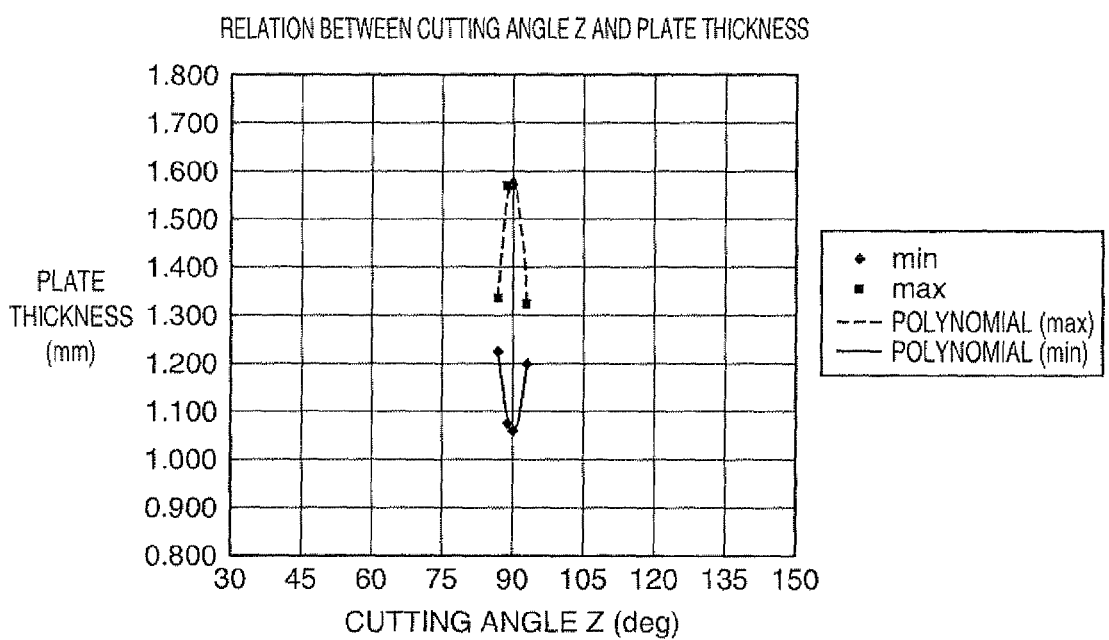
" and FIG. 7B is a graph showing a relation between a cutting angle "Z" and a plate thickness "to."

Table 3 shows the analysis results based on simulation of polarization conversion efficiency, in which the relation between the cutting angle "Z" and the design wavelength "λ" and the relation between the cutting angle "Z" and the plate thickness "to" are illustrated. The relation between the cutting angle "Z" and the design wavelength "λ" is also illustrated in FIG. 7A, and the relation between the cutting angle "Z" and the plate thickness "to" is also illustrated in FIG. 7B.

TABLE 3

| | | Cutting angle Z (deg) | | | | | |
|---|---|---|---|---|---|---|---|
| | | 95 | 93 | 90 | 89 | 87 | 85 |
| Design wavelength λ (nm) | Min | NG | 500 | 450 | 455 | 510 | NG |
| | Max | NG | 545 | 640 | 640 | 550 | NG |
| Plate thickness (total) to (mm) | Min | NG | 1.200 | 1.060 | 1.074 | 1.225 | NG |
| | Max | NG | 1.321 | 1.568 | 1.568 | 1.332 | NG |

From Table 3 and FIGS. 7A and 7B, the range of the design wavelength "λ" and the cutting angle "Z" for satisfying the transmission characteristics is as follows.

$$450 \leq \lambda \leq 640 (\text{nm})$$

$$87 \leq Z \leq 93 (\text{deg})$$

Figure 8:
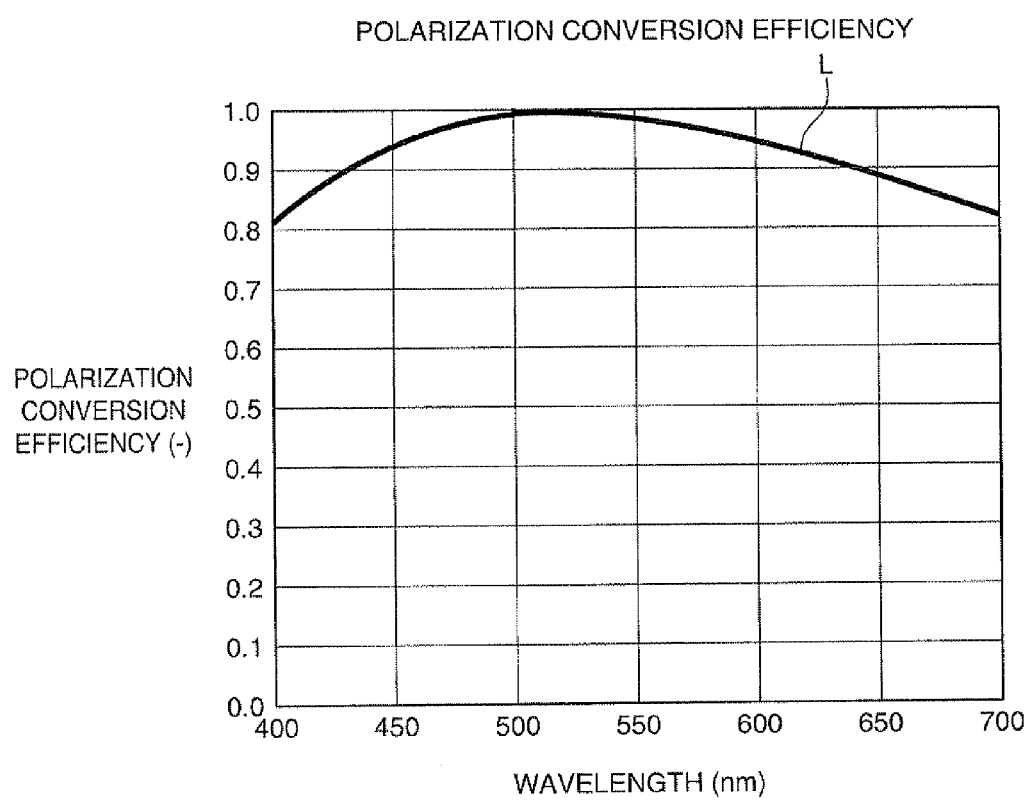
FIG. 8 is a graph showing polarization conversion efficiency of the translucent substrate of the second embodiment.

When the design wavelength "λ" and the cutting angle "Z" are designed so that the relation thereof satisfies the expressions (5) and (6) which are the relational expressions of the upper and lower limits, respectively, the specifications M and N of the above-described transmission characteristics (transmission loss) can be satisfied as shown in FIG. 8, for example.

FIG. 8 shows polarization conversion efficiency of the translucent substrate 21A which is a ½-wavelength plate designed in the present embodiment. In FIG. 8, a plurality of data is displayed so as to overlap with a curve L depicted by a bold line.

As shown in FIG. 8, the polarization conversion efficiency is equal to or greater than 0.8 for wavelengths of 400 nm to 700 nm, and the average of transmission loss is within 20%. The polarization conversion efficiency exhibits a high value of 0.9 or more for wavelengths of 500 nm to 600 nm. The specification that the transmission loss is within 10% can be sufficiently satisfied.

Therefore, when the plate thickness $m_1$ of the first inorganic crystal material 211 is 0.048 mm, and the wavelength is 520 nm, the phase difference of the first inorganic crystal material 211 becomes 270 deg. When the plate thickness $m_2$ of the second inorganic crystal material 212 is 0.020 mm, and the wavelength is 520 nm, the phase difference of the second inorganic crystal material 212 becomes 110 deg.

In the second embodiment, the following advantages can be obtained as well as the same advantages as (1) and (3) to (7) of the first embodiment.

(8) In the present embodiment, the condition (B), that is, the relation between the design wavelength "λ," the cutting angle "Z," and the plate thickness "to" when the design wavelength is "λ," the plate thickness of the translucent substrate 21A is "to," and the cutting angle of the inorganic crystal material is "Z," for allowing the P-polarized light beam P having passed through the polarization separating portion 21B and been incident to the translucent substrate 21A to exit from an exit-side surface of the translucent substrate 21A while maintaining the polarization plane is set so as to satisfy the following relations.

$$\lambda \leq -10.75 \times Z^2 + 1933.9 \times Z - 86330 \quad (5)$$

$$\lambda \geq 6.25 \times Z^2 - 1126.6 \times Z + 51216 \quad (6)$$

$$to \leq -0.0281 \times Z^2 + 5.0512 \times Z - 225.61 \quad (7)$$

$$to \geq 0.0173 \times Z^2 - 3.1146 \times Z + 141.39 \quad (8)$$

Moreover, the phase differences $\Gamma_1$ and $\Gamma_2$ of the first and second inorganic crystal materials 211 and 212 are set so as to satisfy the following relation.

$$|\Gamma_1 - \Gamma_2| = 180 (\text{deg}) \quad (9)$$

Therefore, it is possible to eliminate a change of the polarization state and to obtain favorable optical characteristics.

(9) The translucent substrate 21A is made up of the two first and second inorganic crystal materials 211 and 212. Moreover, when an optical axis azimuth of the first inorganic crystal material 211 seen from a normal of the translucent substrate 21A is $\theta_{01}$, an optical axis azimuth with respect to a light beam advancing in the first inorganic crystal material 211 is $\theta_{11}$, the angle between the light beam and the normal of the crystal optical axis $PO_1$ is $\theta_{21}$, the refractive index of the first inorganic crystal material 211 is $n_{c1}$, and the refractive index of an air layer adjacent to the first inorganic crystal material 211 is $n_a$, the optical axis azimuth $\theta_{01}$ of the first inorganic crystal material 211 is calculated from the following expressions.

$$\theta_{01} = a\tan(\tan\theta_{11} \times \cos\theta_{21}) \quad (A11)$$

$$n_a \sin\alpha = n_{c1} \sin\theta_{21} \quad (A21)$$

Moreover, when an optical axis azimuth of the second inorganic crystal material 212 seen from the normal of the translucent substrate 21A is $\theta_{02}$, an optical axis azimuth with respect to a light beam advancing in the second inorganic crystal material 212 is $\theta_{12}$, the angle between the light beam and the normal of the crystal optical axis $PO_2$ is $\theta_{22}$, the refractive index of the second inorganic crystal material 212 is $n_{c2}$, and the refractive index of the first inorganic crystal material 211 adjacent to the second inorganic crystal material 212 is $n_{c1}$, the optical axis azimuth $\theta_{02}$ of the second inorganic crystal material 212 is calculated from the following expressions.

$$\theta_{02} = a\tan(\tan\theta_{12} \times \cos\theta_{22}) \quad (A12)$$

$$n_{c1} \sin\theta_{21} = n_{c2} \sin\theta_{22} \quad (A22)$$

Therefore, when the translucent substrate 21A is a retardation plate made up of the first and second inorganic crystal materials 211 and 212, it is possible to provide the polarization converting element having favorable conversion efficiency easily.

Next, the third embodiment of the invention will be described based on FIGS. 5, 9, and 10.

As shown in FIG. 5, the third embodiment is the same as the second embodiment in that the translucent substrate 21A is made up of the two first and second inorganic crystal materials 211 and 212. However, a specific configuration of the first and second inorganic crystal materials 211 and 212 is different from that of the second embodiment.

Figure 9:
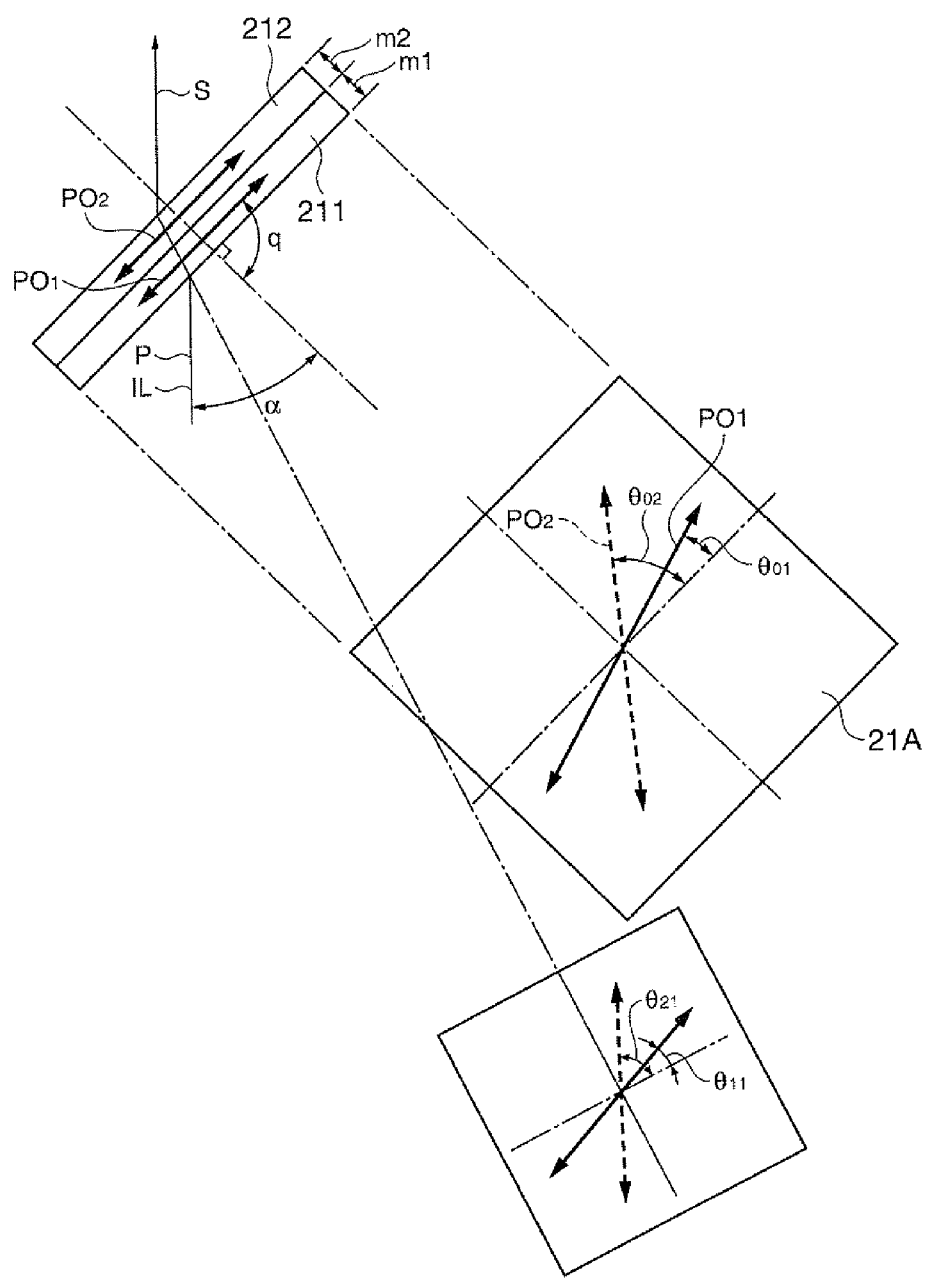
FIG. 9 is a diagram illustrating an optical axis azimuth of a translucent substrate according to a third embodiment of the invention.

FIG. 9 shows the optical axis azimuth of the translucent substrate 21A of the third embodiment.

In FIG. 9, the translucent substrate 21A of the third embodiment is a ½-wavelength plate and is obtained by bonding the first and second inorganic crystal materials 211 and 212 so that the crystal optical axes thereof $PO_1$ and $PO_2$ cross each other.

In the present embodiment, the translucent substrate 21A is a so-called WB1-type wide-band retardation plate which is formed by bonding the first and second inorganic crystal materials 211 and 212. The optical axis azimuths $\theta_{01}$ and $\theta_{02}$ of the first and second inorganic crystal materials 211 and 212 are calculated in a manner similarly to the second embodiment. However, in the present embodiment, the sum of the optical axis azimuths $\theta_{11}$ and $\theta_{12}$ is 90 deg.

The refractive indices $n_{c1}$ and $n_{c2}$ of the quartz crystals which are the materials of the first and second inorganic crystal materials 211 and 212 are 1.54, the refractive index $n_a$ of air is 1.00, the optical axis azimuth $\theta_{11}$ is 22.5 deg, the optical axis azimuth $\theta_{12}$ is 67.5 deg (=90 deg−22.5 deg), and the incidence angle $\alpha$ is 45 deg. The optical axis azimuths $\theta_{01}$ and $\theta_{02}$ can be calculated from the expressions (A11), (A21), (A12), and (A22).

The optical axis azimuth $\theta_{01}$ is calculated as follows.

$$n_a \sin\alpha = n_{c1} \sin\theta_{21} \quad (A21)$$

$$1.00 \times \sin 45 \text{ deg} = 1.54 \times \sin\theta_{21}$$

$$0.7071 = 1.54 \times \sin\theta_{21}$$

$$\theta_{21} = 27.32 \text{ deg}$$

$$\begin{aligned}
\theta_{01} &= \mathrm{atan}(\tan\theta_{11} \times \cos\theta_{21})(A11) \\
&= \mathrm{atan}(\tan 45 deg \times \cos 27.32 deg) \\
&= \mathrm{atan}(0.89) \\
&= 41.7 (deg)
\end{aligned}$$

The optical axis azimuth $\theta_{02}$ is calculated as follows.

$$n_{c1} \sin\theta_{21} = n_{c2} \sin\theta_{22} \quad (A22)$$

$$1.54 \sin 27.32 \text{ deg} = 1.54 \sin\theta_{22}$$

$$\theta_{22} = 27.32 \text{ deg}$$

$$\begin{aligned}
\theta_{02} &= \mathrm{atan}(\tan\theta_{12} \times \cos\theta_{22})(A12) \\
&= \mathrm{atan}(\tan 67.5 deg \times \cos 27.32 deg) \\
&= \mathrm{atan}(2.14) \\
&= 65.0 (deg)
\end{aligned}$$

In the third embodiment, similarly to the respective embodiments described above, polarization conversion efficiency is analyzed by simulation when the incidence angle to the translucent substrate 21A is tilted by a step of 5 (deg) within a range of ±10 (deg) about 45 (deg). The polarization conversion efficiency in a predetermined wavelength region is averaged by the wavelength region, and the transmission loss in the averaged polarization conversion efficiency is evaluated by average. The transmission characteristics when the polarization converting element according to the present embodiment is mounted on a projection-type imaging device are set to satisfy the following specifications.

M: Transmission loss is within 10% for wavelengths of 500 to 600 nm

N: Transmission loss is within 20% for wavelengths of 400 to 700 nm

Design conditions are set so as to satisfy these two specifications M and N.

In the so-called WB1-type wide-band retardation plate, the following condition (C) is satisfied.

Condition (C)

When a design wavelength is "$\lambda$," a plate thickness of the translucent substrate is "to," and a cutting angle of the inorganic crystal material is "Z," the relation between the design wavelength "λ," the cutting angle "Z," and the plate thickness "to" satisfies the following expressions (10), (11), (12), and (13).

$$\lambda \leq -2E\text{-}07 \times Z^6 + 0.0001 \times Z^5 - 0.024 \times Z^4 + 2.7749 \times Z^3 - 178.61 \times Z^2 + 6067.8 \times Z - 84312 \quad (10)$$

$$\lambda \geq -4E\text{-}05 \times Z^3 + 0.0757 \times Z^2 - 10.073 \times Z + 696.9 \quad (11)$$

$$to \leq -2E\text{-}08 \times Z^4 + 6E\text{-}06 \times Z^3 - 0.0008 \times Z^2 + 0.0495 \times Z - 0.9844 \quad (12)$$

$$to \geq 5E\text{-}07 \times Z^3 - 0.0001 \times Z^2 + 0.0065 \times Z - 0.0924 \quad (13)$$

Here, similarly to the second embodiment, the plate thickness "to" is defined by the plate thickness of a retardation plate obtained by bonding the first and second inorganic crystal materials 211 and 212. That is, the plate thickness "to" is a total plate thickness of the plate thicknesses t211 and t212 of the first and second inorganic crystal materials 211 and 212.

The expressions (10) and (11) represent the relation between the design wavelength "λ" and the cutting angle "Z," and among these, the expression (10) is a relational expression of an upper limit, and the expression (11) is a relational expression of a lower limit. Moreover, the expressions (12) and (13) represent the relation between the cutting angle "Z" and the plate thickness "to," and among these, the expression (12) is a relational expression of an upper limit, and the expression (13) is a relational expression of a lower limit.

Figure 10A:
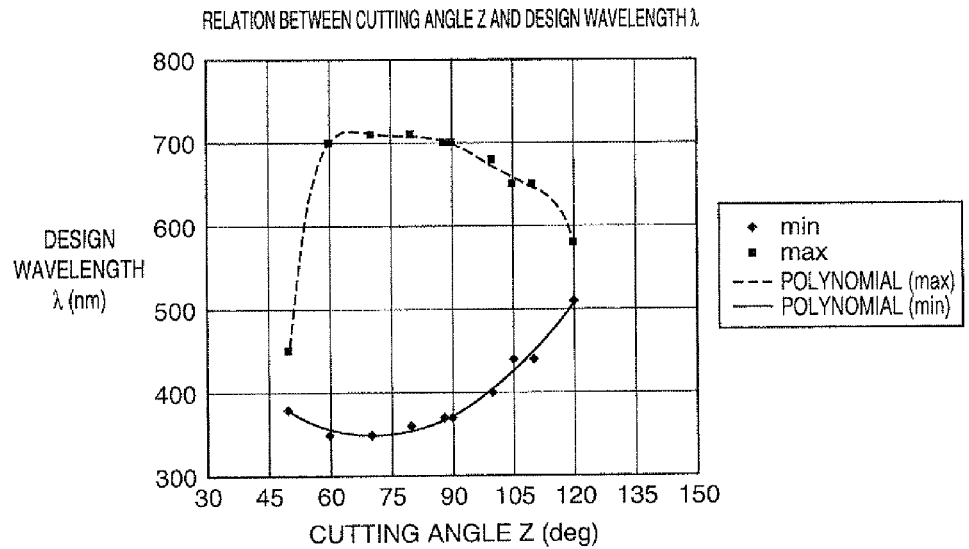
FIG. 10A is a graph showing a relation between a cutting angle "Z" and a design wavelength "λ.
Figure 10B:
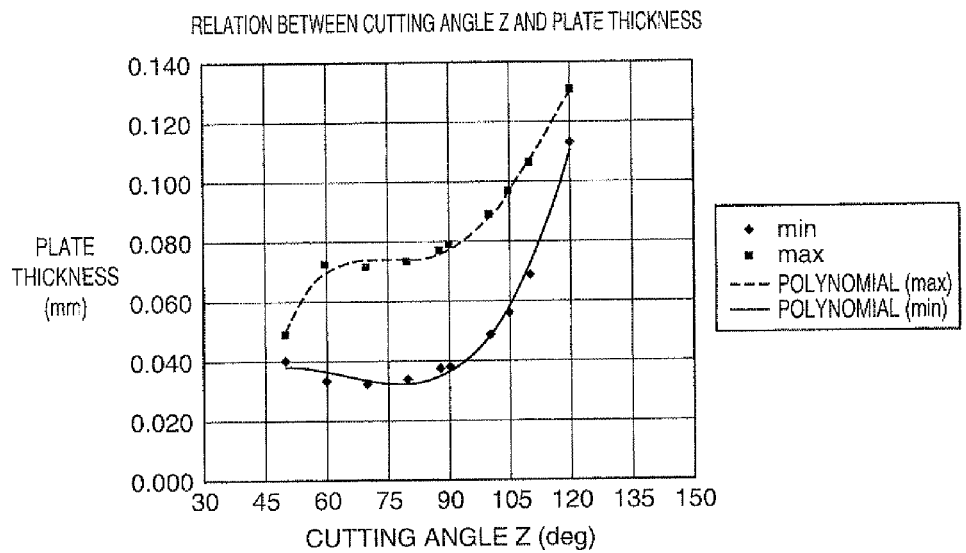
" and FIG. 10B is a graph showing a relation between a cutting angle "Z" and a plate thickness "to."

Table 4 shows the analysis results based on simulation of polarization conversion efficiency, in which the relation between the cutting angle "Z" and the design wavelength "λ" and the relation between the cutting angle "Z," and the plate thickness "to" are illustrated. The relation between the cutting angle "Z" and the design wavelength "λ" is also illustrated in FIG. 10A, and the relation between the cutting angle "Z" and the plate thickness "to" is also illustrated in FIG. 10B.

of 400 nm to 700 nm, and the average of transmission loss is within 20%. The polarization conversion efficiency exhibits a high value of 0.9 (very close to 1.0) or more for wavelengths of 500 nm to 600 nm. The specification that the transmission loss is within 10% can be sufficiently satisfied.

Therefore, when the plate thickness $m_1$ of the first inorganic crystal material 211 is 0.048 mm, and the wavelength is 520 nm, the phase difference of the first inorganic crystal material 211 becomes 270 deg. When the plate thickness $m_2$ of the second inorganic crystal material 212 is 0.020 mm, and the wavelength is 520 nm, the phase difference of the second inorganic crystal material 212 becomes 110 deg.

In the third embodiment, the following advantages can be obtained as well as the same advantages as (1), (3) to (7), and (9) of the second embodiment.

(10) The condition (C), that is, the relation between the design wavelength "λ," the cutting angle "Z," and the plate thickness "to" when the design wavelength is "λ," the plate thickness of the translucent substrate 21A is "to," and the cutting angle of the inorganic crystal material is "Z," for allowing the P-polarized light beam P having passed through the polarization separating portion 21B and been incident to the translucent substrate 21A to exit from an exit-side surface of the translucent substrate 21A while maintaining the polarization plane is set so as to satisfy the following relations.

$$\lambda \leq -2E\text{-}07 \times Z^6 + 0.0001 \times Z^5 - 0.024 \times Z^4 + 2.7749 \times Z^3 - 178.61 \times Z^2 + 6067.8 \times Z - 84312 \quad (10)$$

$$\lambda \geq -4E\text{-}05 \times Z^3 + 0.0757 \times Z^2 - 10.073 \times Z + 696.9 \quad (11)$$

$$to \leq -2E\text{-}08 \times Z^4 + 6E\text{-}06 \times Z^3 - 0.0008 \times Z^2 + 0.0495 \times Z - 0.9844 \quad (12)$$

$$to \geq 5E\text{-}07 \times Z^3 - 0.0001 \times Z^2 + 0.0065 \times Z - 0.0924 \quad (13)$$

Therefore, it is possible to eliminate a change of the polarization state and to obtain favorable optical characteristics.

TABLE 4

| | | Cutting angle Z (deg) | | | | | | | | | | | |
|---|---|---|---|---|---|---|---|---|---|---|---|---|---|
| | | 130 | 120 | 110 | 105 | 100 | 90 | 88 | 80 | 70 | 60 | 50 | 45 |
| Design wavelength λ (nm) | Min | NG | 510 | 440 | 440 | 400 | 370 | 370 | 360 | 350 | 350 | 380 | NG |
| | Max | NG | 580 | 650 | 650 | 680 | 700 | 700 | 710 | 710 | 700 | 450 | NG |
| Plate thickness (total) to (mm) | Min | NG | 0.113 | 0.069 | 0.056 | 0.049 | 0.038 | 0.037 | 0.034 | 0.032 | 0.033 | 0.040 | NG |
| | Max | NG | 0.130 | 0.106 | 0.097 | 0.089 | 0.079 | 0.077 | 0.073 | 0.071 | 0.072 | 0.049 | NG |

From Table 4 and FIGS. 10A and 10B, the range of the design wavelength "λ" and the cutting angle "Z" for satisfying the transmission characteristics is as follows.

$$450 \leq \lambda \leq 640 \text{(nm)}$$

$$87 \leq Z \leq 93 \text{(deg)}$$

Figure 11:
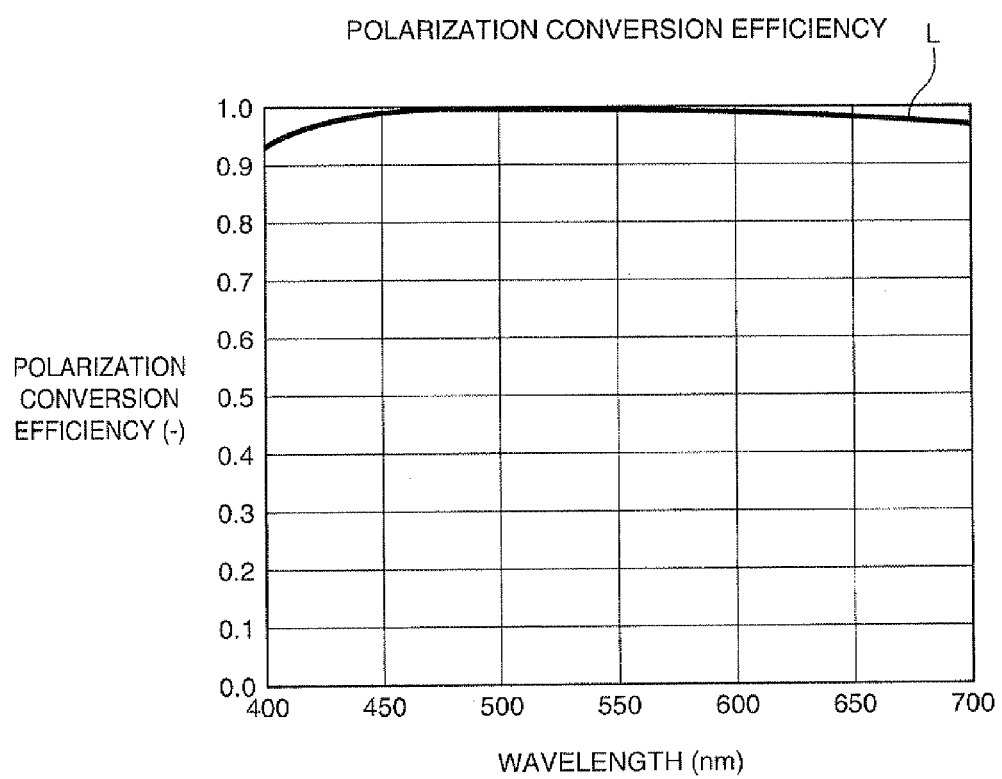
FIG. 11 is a graph showing polarization conversion efficiency of the translucent substrate of the third embodiment.

When the design wavelength "λ" and the cutting angle "Z" are designed so that the relation thereof satisfies the expressions (10) and (11) which are the relational expressions of the upper and lower limits, respectively, the specifications M and N of the above-described transmission characteristics (transmission loss) can be satisfied as shown in FIG. 11, for example.

FIG. 11 shows polarization conversion efficiency of the translucent substrate 21A which is a ½-wavelength plate designed in the present embodiment. In FIG. 11, a plurality of data is displayed so as to overlap with a curve L depicted by a bold line.

As shown in FIG. 11, the polarization conversion efficiency is equal to or greater than 0.8 (or 0.9) for wavelengths Next, the fourth embodiment of the invention will be described based on FIGS. 12 to 15.

In the fourth embodiment, a polarization converting unit 4 is provided in a liquid crystal projector 100 which is a projection-type imaging device and includes a holding member 5 which is different from that of the polarization converting unit 1 of the first embodiment.

Figure 12:
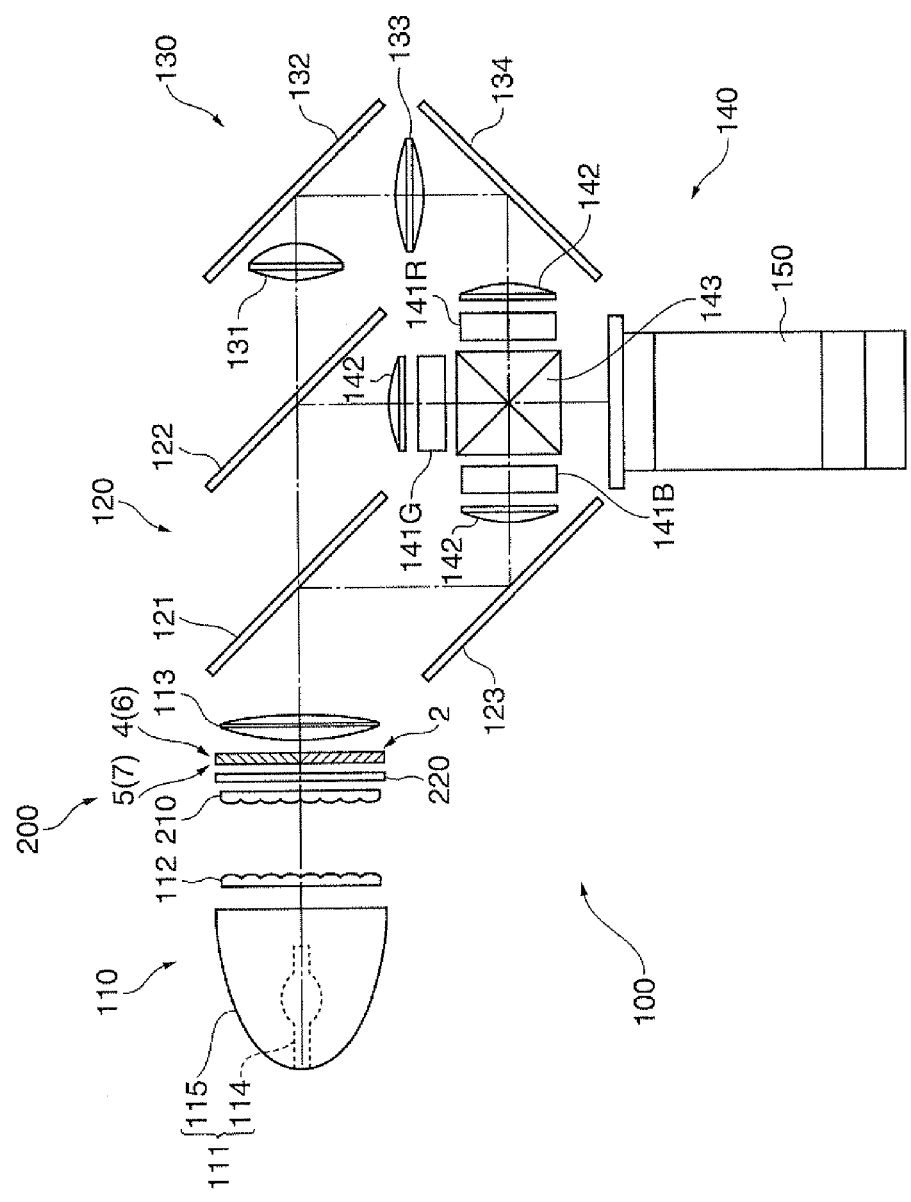
FIG. 12 is a schematic configuration diagram of a liquid crystal projector in which a fourth embodiment of the invention is incorporated.

FIG. 12 shows a schematic configuration of a liquid crystal projector.

In FIG. 12, a liquid crystal projector 100 includes an integrator illuminating optical system 110, a color separating optical system 120, a relay optical system 130, an optical modulation device 140 that modulates light emitted from a light source in accordance with image information, and a projection optical device 150 that enlarges and projects the light modulated by the optical modulation device 140.

The integrator illuminating optical system 110 is an optical system for illuminating image formation regions of three transmissive liquid crystal panels 141R, 141G, and 141B described later substantially uniformly. The integrator illuminating optical system 110 includes a light source device 111, a first lens array 112, a polarization converting device 200, and a superimposed lens 113.

In the light source device 111, radiating light beams emitted from a light source lamp 114 are reflected by a reflector 115 to become approximately parallel light beams, which are then output to the outside.

The polarization converting device 200 includes a second lens array 210, a light shielding plate 220, and the polarization converting unit 4 according to the second embodiment.

The color separating optical system 120 includes two dichroic mirrors 121 and 122 and a reflecting mirror 123. A plurality of light beams emitted from the integrator illuminating optical system 110 is separated into light beams of the three colors red, green, and blue by the dichroic mirrors 121 and 122. A blue light beam separated by the dichroic mirror 121 is reflected by the reflecting mirror 123 to reach a blue transmissive liquid crystal panel 141B after passing through a field lens 142.

A green light beam among the red and green light beams having passed through the dichroic mirror 121 is reflected by the dichroic mirror 122 to reach a green transmissive liquid crystal panel 141G after passing through the field lens 142.

The relay optical system 130 includes an incidence-side lens 131, a relay lens 133, and reflecting mirrors 132 and 134. The red light beam separated by the color separating optical system 120 passes through the dichroic mirror 122 to reach a red transmissive liquid crystal panel 141R after passing through the relay optical system 130 and the field lens 142.

The optical modulation device 140 includes the transmissive liquid crystal panels 141R, 141G, and 141B, and a cross-dichroic prism 143. The cross-dichroic prism 143 combines optical images modulated into respective color light beams to form a color optical image.

The polarization converting unit 4 includes the polarization converting element 2 having the same structure as the first embodiment and the holding member 5 for holding the polarization converting element 2.

Figure 13:
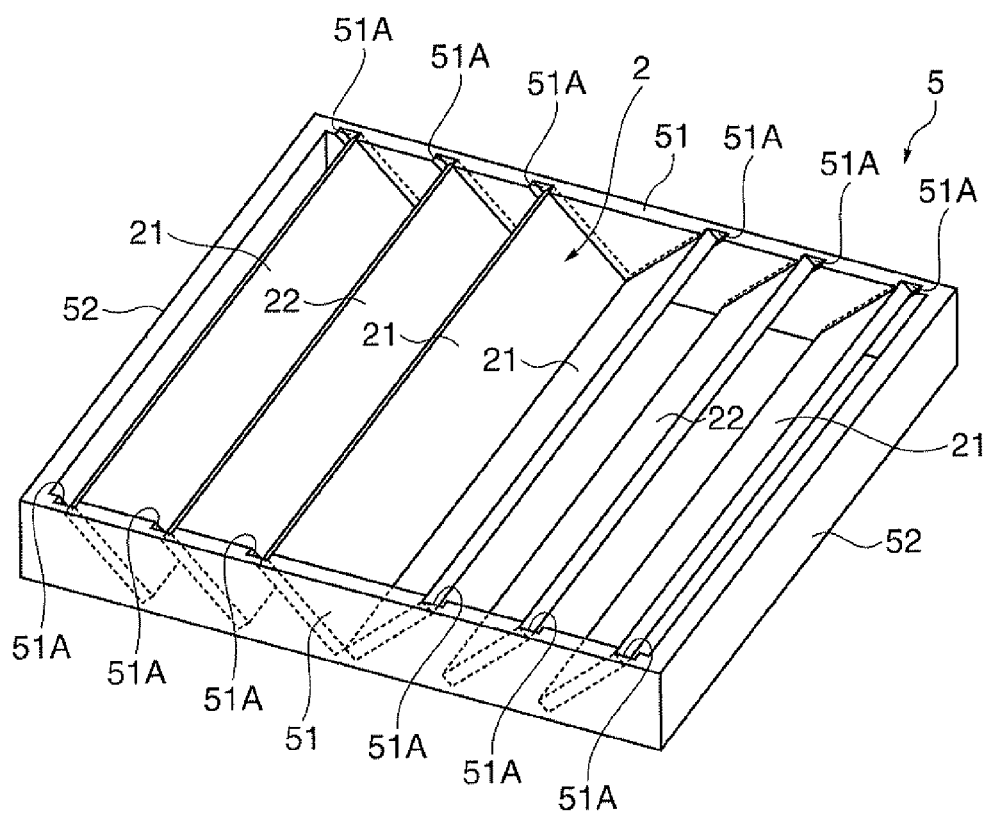
FIG. 13 is a perspective view showing a polarization converting unit according to the fourth embodiment.
Figure 14A:
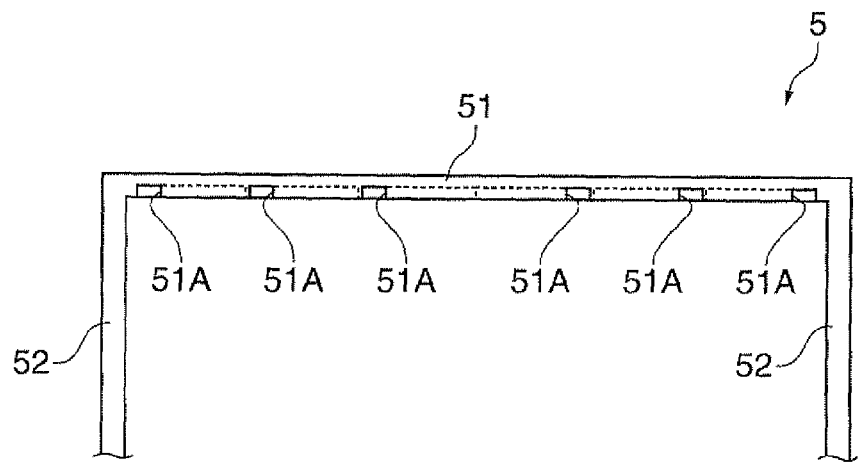
FIG. 14A is a plan view of a holding member.
Figure 14B:
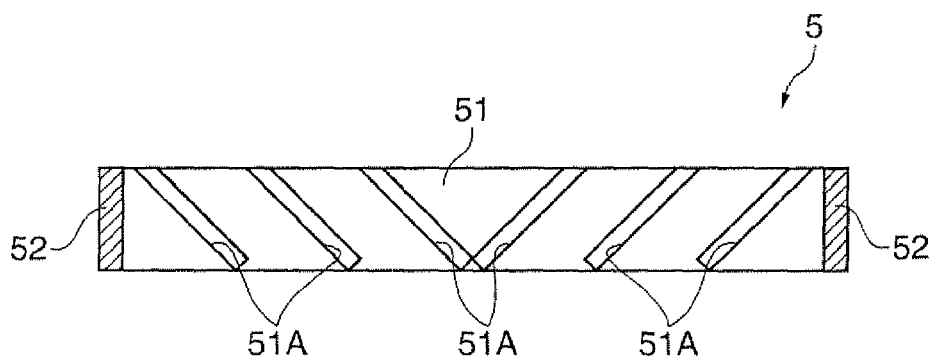
FIG. 14B is a cross-sectional view of the holding member.
Figure 15:
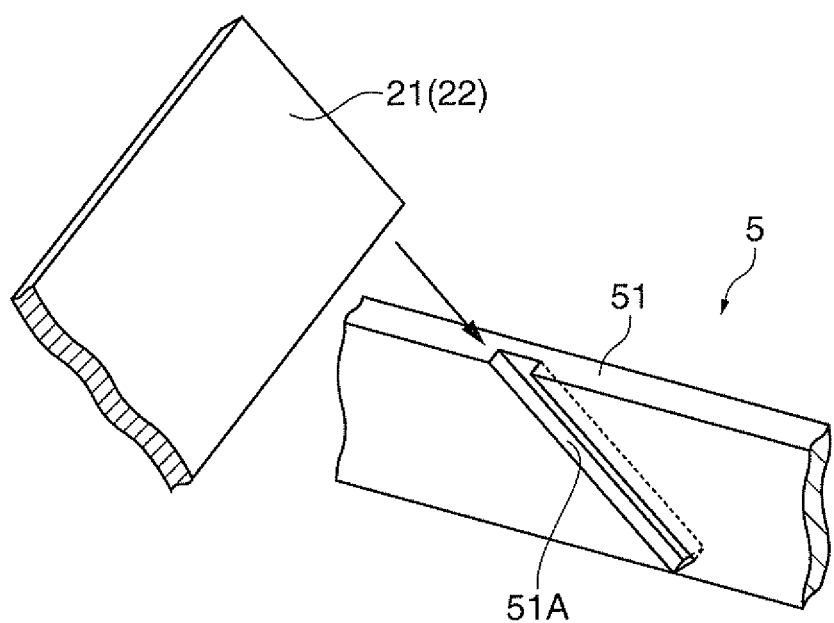
FIG. 15 is an exploded perspective view showing a part of the holding member.

A specific structure of the holding member 5 is shown in FIGS. 13 to 15.

FIG. 13 is a perspective view of the holding member 5, FIG. 14A is a plan view of the holding member 5, and FIG. 14B is a cross-sectional view of the holding member 5.

In these drawings, the holding member 5 has a structure which includes a pair of holding plates 51 for holding both ends of the polarization separating element 21 and both ends of the reflecting element 22 and a pair of connecting plates 52 for connecting both ends of the pair of holding plates 51. The holding plates 51 and the connecting plates 52 are integrally formed of a synthetic resin in a flat rectangular frame shape.

A plurality of pairs of guide grooves 51A for guiding the polarization separating element 21 and the reflecting element 22, respectively, is formed in portions of the pair of holding plates 51 facing each other. These guide grooves 51A are formed such that the longitudinal direction thereof is at 45 deg or 135 deg with respect to an incident light.

In FIG. 13 and FIGS. 14A and 14B, four pairs of guide grooves 51A for accommodating the polarization separating elements 21 and two pairs of guide grooves 51A for accommodating the reflecting elements 22 are illustrated. However, in these drawings, since the holding member 5 is illustrated in an enlarged scale so that the configuration of the guide grooves 51A can be understood easily, in fact, four pairs of guide grooves 51A for accommodating four polarization separating elements 21 and four pairs of guide grooves 51A for accommodating four reflecting elements 22 are provided in compliance with the polarization converting element 2 shown in FIG. 1. However, the number of guide grooves 51A is not limited to the above but corresponds to the number of polarization separating elements 21 and reflecting elements 22 which are provided actually.

FIG. 15 is an exploded perspective view of a part of the holding member 5. In FIG. 15, the guide groove 51A is formed so that one end thereof is opened to one side surface of the holding plate 51, and a step is formed at the other end thereof so that an end portion of the polarization separating element 21 or the reflecting element 22 bumps into the other end. The guide groove 51A has a width that is the same as or slightly larger than the width of the polarization separating element 21 or the reflecting element 22 and has a length that is the same as or slightly larger than the length of the polarization separating element 21 or the reflecting element 22.

In the fourth embodiment, the following advantages can be obtained as well as the same advantages as (1) to (6) of the first embodiment.

(11) The liquid crystal projector 100 is configured to include the polarization converting unit 4 including the polarization converting element 2 that converts light from the light source device 111 into an S-polarized light beam S and outputs the S-polarized light beam S, the optical modulation device 140 that modulates the light output from the polarization converting element 2 in accordance with image information, and the projection optical device 150 that projects the light modulated by the optical modulation device 140. Therefore, it is possible to increase the projection accuracy of the liquid crystal projector 100 due to the high polarization conversion efficiency of the polarization converting element 2.

(12) Since the optical modulation device 140 is configured to include the transmissive liquid crystal panels 141R, 141G, and 141B, from this respect, it is also possible to provide the liquid crystal projector 100 having high projection accuracy.

(13) The polarization converting unit 4 includes the holding member 5 for holding the polarization converting element 2, and the holding member 5 has a structure which includes the pair of holding plates 51 for holding both ends of the polarization separating element 21 and both ends of the reflecting element 22, respectively, and the pair of connecting plates 52 for connecting both ends of the pair of holding plates 51. Therefore, since the polarization separating elements 21 and the reflecting elements 22 can be accommodated in such a compact holding member, satisfactory handling convenience is provided.

(14) Since the pair of holding plates 51 and the pair of connecting plates 52 are formed to be integrated with each other, it is possible to manufacture the holding member 5 easily by an appropriate means such as injection molding.

(15) The guide grooves 51A for guiding the polarization separating element 21 and the reflecting element 22, respectively are formed in the portions of the pair of holding plates 51 facing each other, and these guide grooves are opened to one set of side surfaces of the pair of holding plates 51. Therefore, since the polarization converting unit can be assembled just by inserting the polarization separating elements 21 and the reflecting elements 22 along the guide grooves 51A, the assembly work is made easy.

Next, the fifth embodiment of the invention will be described based on FIGS. 16 and 17.

In the fifth embodiment, the holding member has a different structure from that of the fourth embodiment, and the other configuration is the same as that of the fourth embodiment.

Figure 16:
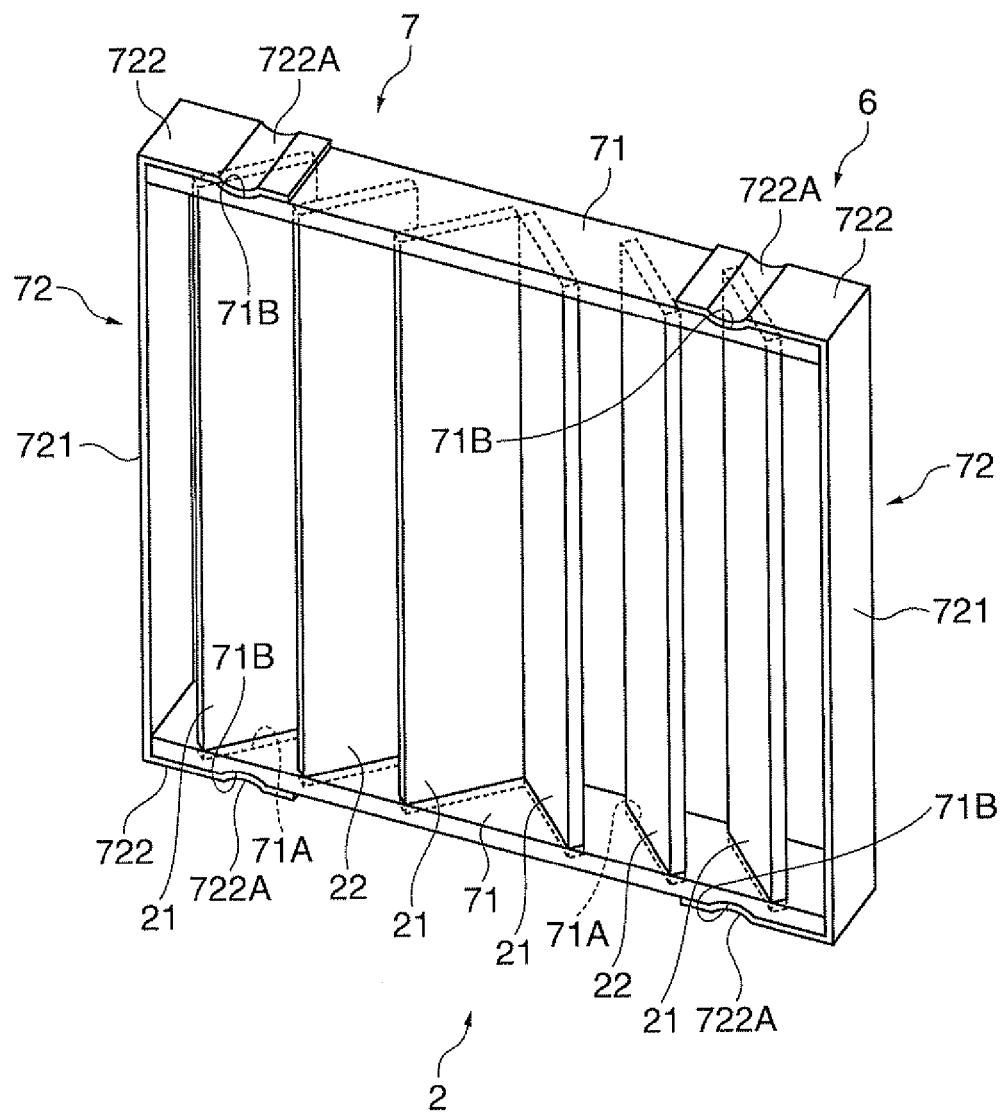
FIG. 16 is a perspective view showing a polarization converting unit according to a fifth embodiment of the invention.
Figure 17:
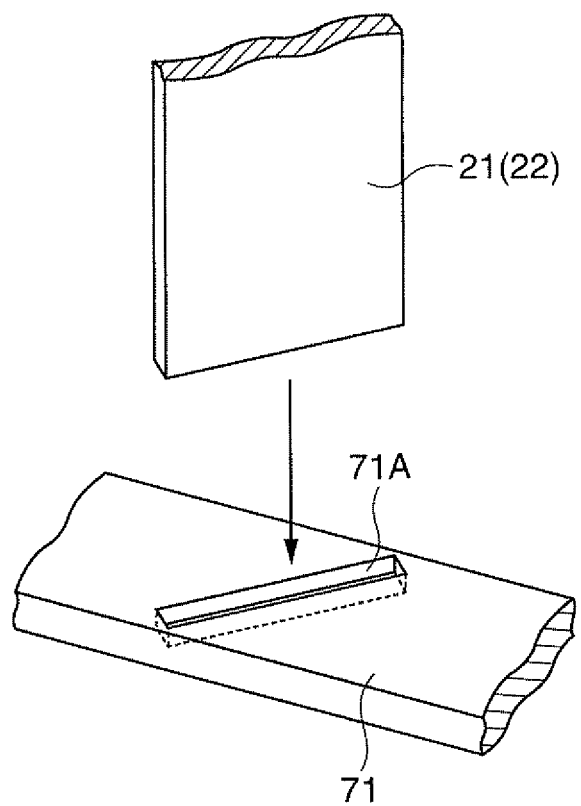
FIG. 17 is an exploded perspective view showing a part of a holding member.

FIG. 16 is a perspective view showing a polarization converting unit according to the fifth embodiment, and FIG. 17 is an exploded perspective view showing a part of the holding member.

In these drawings, a polarization converting unit 6 includes the polarization converting element 2 having the same structure as the first embodiment and a holding member 7 for holding the polarization converting element 2.

The holding member 7 includes a pair of holding plates 71 and a pair of connecting plates 72 provided at the end portions of the pair of holding plates 71, and the pair of holding plates 71 and the pair of connecting plates 72 are formed to be separated from each other.

The pair of holding plates 71 has a planar shape formed of a synthetic resin, and a plurality of pairs of guide grooves 71A for guiding the end portions of the polarization separating element 21 and the reflecting element 22, respectively, is formed in portions of the pair of holding plates 71 facing each other. These guide grooves 71A are formed such that the longitudinal direction thereof is at 45 deg or 135 deg with respect to an incident light. Moreover, the guide grooves 71A are recess portions having a rectangular surface.

In the fifth embodiment, although a total of six pairs of guide grooves 71A are illustrated, in fact, four pairs of guide grooves 71A for accommodating four polarization separating elements 21 and four pairs of guide grooves 71A for accommodating four reflecting elements 22 are provided in compliance with the polarization converting element 2.

The pair of connecting plates 72 includes a long plate member 721 and engaging pieces 722 that are connected to the plate member 721 and bias the pair of holding plates 71 in such a direction as to face each other.

The plate member 721 and the engaging piece 722 are integrally formed of an elastic material such as a metal or a synthetic resin. The engaging piece 722 is formed by being folded in relation to the plate member 721, and a convex pressing portion 722A that engages with the recess portion 71B formed in the holding plate 71 is formed in the central portion of the engaging piece 722. The convex pressing portion 722A and the recess portion 71B are formed so as to extend in a direction orthogonal to the longitudinal direction of the holding plate 71.

In the fifth embodiment, the following advantages can be obtained as well as the same advantages as (1) to (6) and (11) to (15) of the fourth embodiment.

(16) The holding member 7 includes the pair of holding plates 71 and the pair of connecting plates 72 provided at the end portions of the pair of holding plates 71, and the pair of connecting plates 72 includes the long plate member 721 and the engaging pieces 722 that are connected to the plate member 721 so as to bias the pair of holding plates 71 in such a direction as to face each other. Therefore, since the pair of holding plates 71 are biased in a mutually approaching direction by the pair of connecting plates 72, the polarization separating element 21 and the reflecting element 22 can be reliably held by the holding member 7. Accordingly, the polarization separating element 21 and the reflecting element 22 will not erroneously drop off from the holding member 7.

(17) Since the engaging piece 722 has the pressing portion 722A that engages with the recess portion 71B formed in the holding plate 71, the connecting plate 72 will not be shifted in the longitudinal direction of the holding plate 71 or disengaged therefrom. Therefore, it is possible to prevent the connecting plate 72 from being erroneously disengaged from the holding plate 71.

(18) Since the guide grooves 71A which are formed in the holding plate 71 so that the end portions of the polarization separating element 21 and the reflecting element 22 are held therein are recess portions having a rectangular surface, the movement of the polarization separating element 21 and the reflecting element 22 within the plane of the holding plate 71 is restricted. Therefore, from this respect, the polarization separating element 21 and the reflecting element 22 will not erroneously drop off from the holding member 7.

Next, the sixth embodiment of the invention will be described based on FIG. 18.

In the sixth embodiment, the polarization separating element has a different configuration from that of the first embodiment, and the other configuration is the same as that of the first embodiment.

Figure 18:
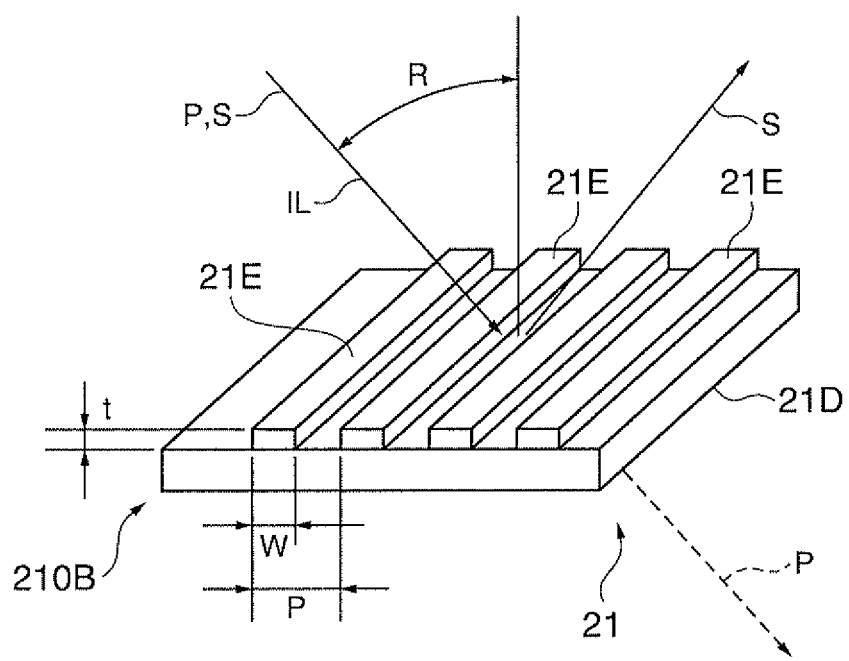
FIG. 18 is a perspective view of a polarization separating element according to a sixth embodiment of the invention.

FIG. 18 is a perspective view of a polarization separating portion 210B of a polarization separating element according to the sixth embodiment. In FIG. 18, the polarization separating portion 210B of the polarization separating element 21 is formed from conductive electrodes 21E formed of a number of parallel metal wires supported by a dielectric substrate 210. The conductive electrodes 21E has a pitch or cycle of P, and the width of an individual conductor is W, and the thickness thereof is t. An incident light IL is incident to the polarization separating element 21 at an angle R from a perpendicular line. The incident light IL is reflected as an S-polarized light beam S and is transmitted as a P-polarized light beam P without being diffracted. Here, the cycle P, the width W, and the thickness t are set in accordance with the frequency region of used light and the other conditions.

In the sixth embodiment, the following advantages can be obtained as well as the same advantages as (1) to (6) of the first embodiment.

(19) Since the polarization separating portion 210B of the polarization separating element 21 is formed of a metal wire grid, it is possible to manufacture the polarization converting element easily.

The invention is not limited to the above-described embodiments, and modifications and improvements can be made within a range where the objects and advantages of the invention can be achieved. Such modifications and improvements naturally fall within the scope of the invention.

For example, in the above embodiments, although the anti-reflection portion 21C has been provided on both surfaces of the translucent substrate 21A constituting the polarization separating element 21, in the invention, it is not always necessary to provide the anti-reflection portion 21C. However, when the anti-reflection portion 21C is provided as in the respective embodiments, a large amount of light can pass through the polarization separating element 21 and the reflecting element 22.

Figure 19:
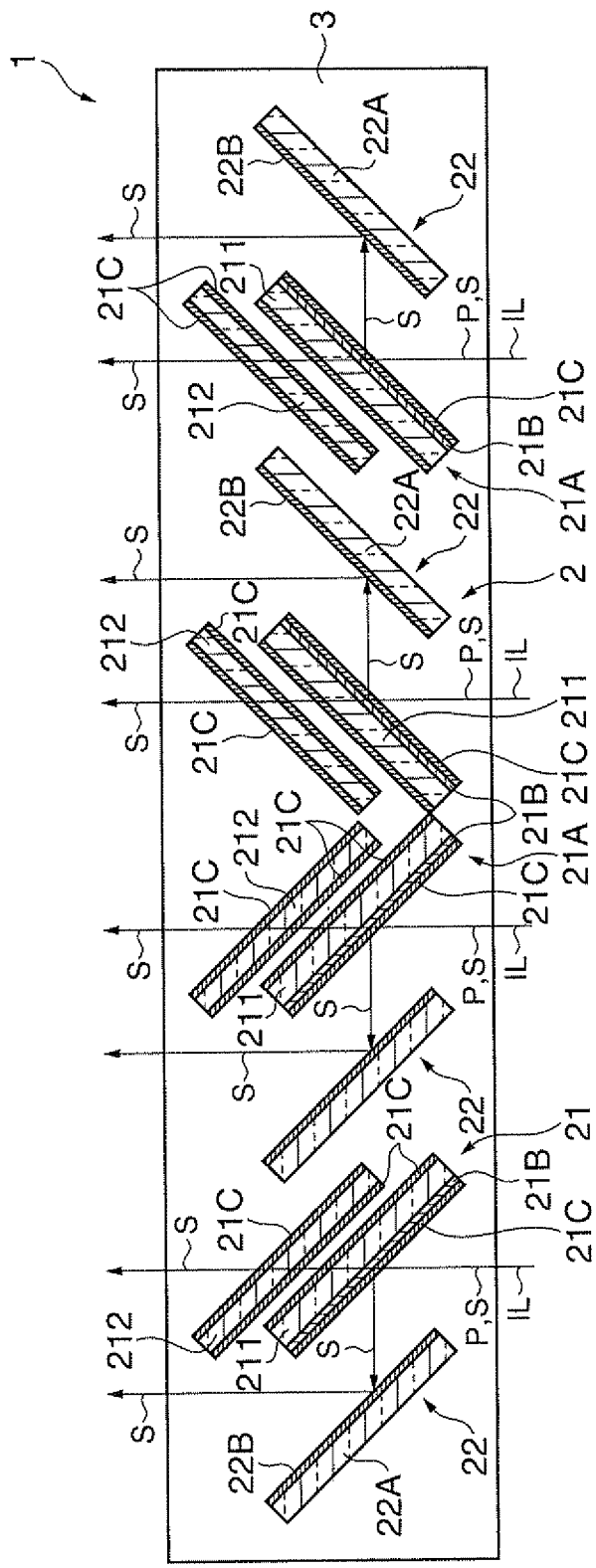
FIG. 19 is a schematic diagram of a polarization converting element according to a modification example of the invention.
Figure 20:
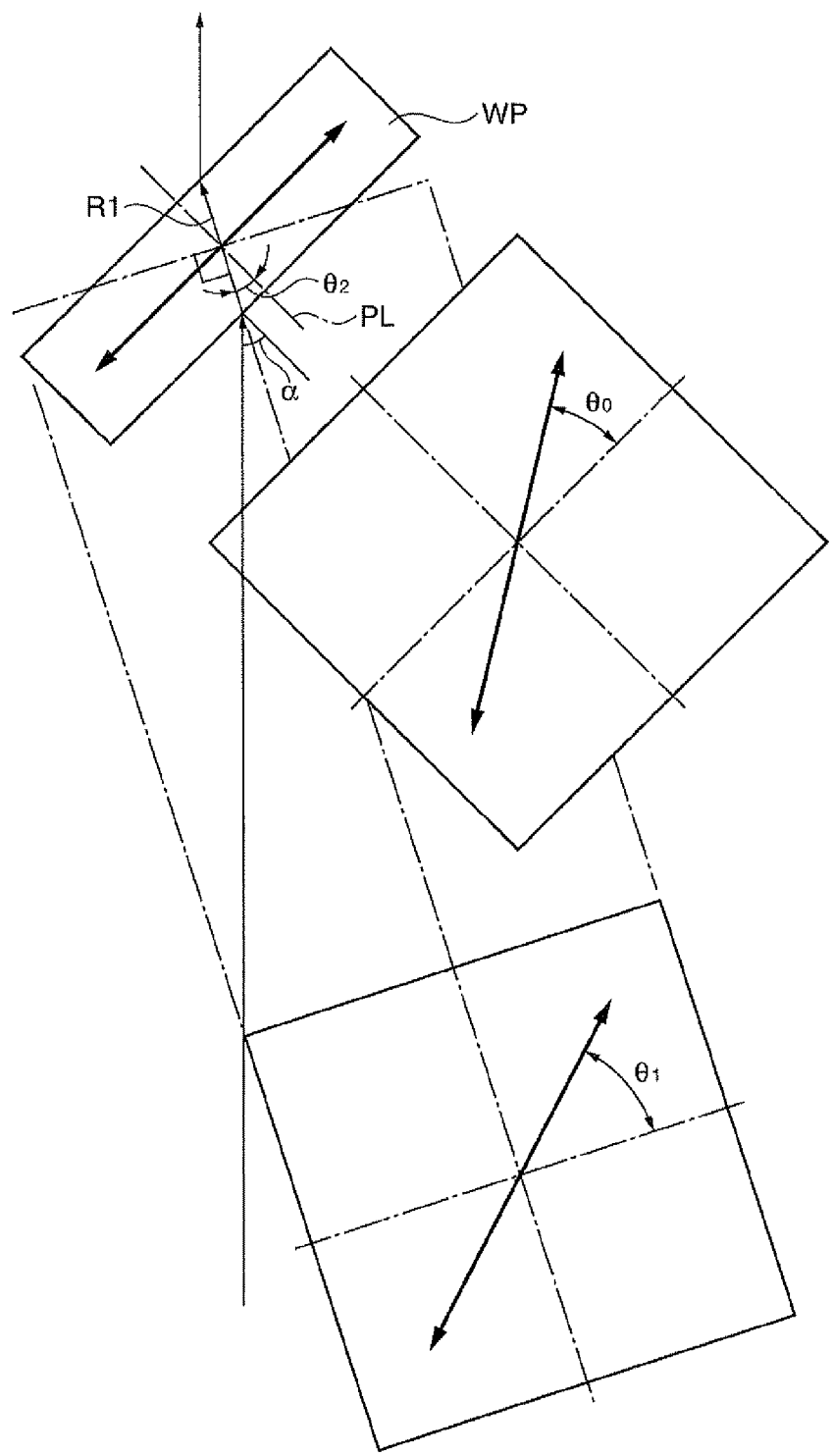
FIG. 20 is a diagram illustrating an optical axis azimuth of a ½-wavelength plate formed of a quartz crystal which is a basic technique of the invention.
Figure 21:
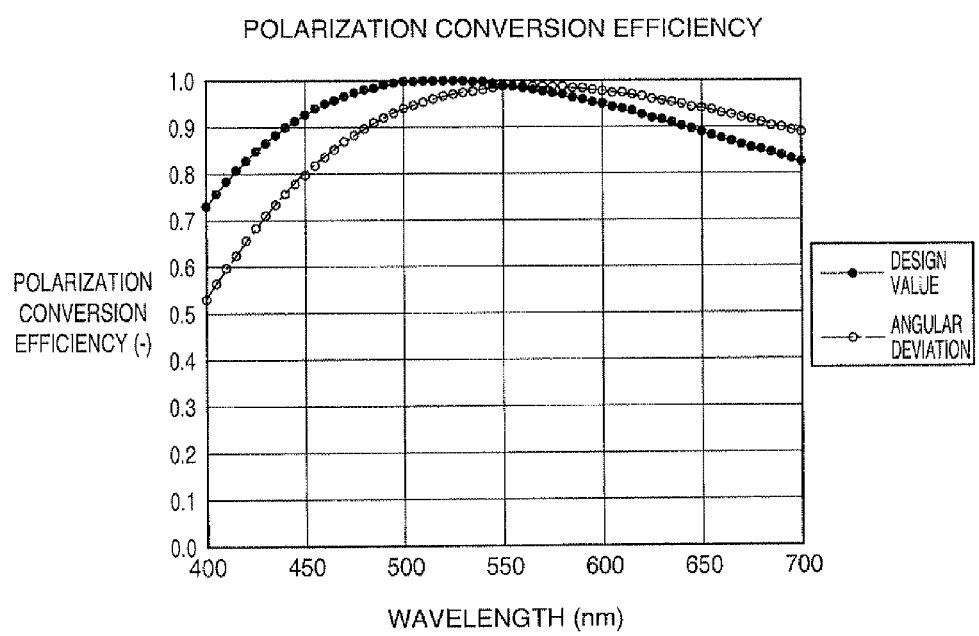
FIG. 21 is a graph showing polarization conversion efficiency of a translucent substrate according to a related art.

Moreover, in the second and third embodiments, the first and second inorganic crystal materials 211 and 212 have been stacked on each other. However, in the invention, as shown in FIG. 19, the first and second inorganic crystal materials 211 and 212 may be disposed to be spaced from each other, and the anti-reflection portion 21C may be formed on both surfaces of the first inorganic crystal material 211 and one surface of the second inorganic crystal material 212.

Moreover, although the polarization converting element has been used in the liquid crystal projector, in the invention, the polarization converting element may be used in a projecting device other than the liquid crystal projector.

Furthermore, it is not always necessary to use a quartz crystal as the reflecting element 22, but a glass may be used instead of a quartz crystal. Moreover, in the polarization separating element 21, it is not always necessary to use a quartz crystal as the translucent substrate 21A, but a crystal material having birefringent properties and optically rotatory power such as a sapphire may be used instead of a quartz crystal.

Furthermore, in the above embodiments, although the polarization separating element 21 has been at about 45 (deg) or 135 (deg) with respect to the incident light IL, the invention is not limited to this, and for example, the angle may be 60 (deg) or 120 (deg).

The invention can be used in a liquid crystal projector and the other projection-type imaging devices.

The entire disclosure of Japanese Patent Application No. 2011-120966, filed May 30, 2011 is expressly incorporated by reference herein.

What is claimed is:

1. A polarization converting element comprising:
a translucent substrate disposed at a predetermined angle with respect to an incident light;
a polarization separating portion disposed on an incidence-side surface of the translucent substrate so as to separate the incident light into a first linearly polarized light beam and a second linearly polarized light beam orthogonal to each other and transmit the first linearly polarized light beam and reflect the second linearly polarized light beam; and
a reflecting element disposed to be separated approximately in parallel to the translucent substrate so as to reflect the second linearly polarized light beam reflected by the polarization separating portion,
wherein the translucent substrate is a retardation element which is formed of an inorganic crystal material having birefringent properties and optically rotatory power and which is configured to convert the first linearly polarized light beam having passed through the polarization separating portion and having been incident to the translucent substrate so as to be parallel to a polarization plane of the second linearly polarized light beam so that the first linearly polarized light beam is output as a second linearly polarized light beam, and
wherein the retardation element satisfies one of the following conditions (A), (B), and (C):

Condition (A)
the translucent substrate is made up of a single plate, and when a design wavelength is "λ," a plate thickness of the translucent substrate is "to," and a cutting angle of the inorganic crystal material is "Z," the relation between the design wavelength "λ," the cutting angle "Z," and the plate thickness "to" satisfies the following expressions (1), (2), (3), and (4):

$$\lambda \leq -0.1293 \times Z^2 + 22.402 \times Z - 325.73 \quad (1)$$

$$\lambda \geq 0.1199 \times Z^2 - 20.762 \times Z + 1348.6 \quad (2)$$

$$to \leq 5E\text{-}06 \times Z^2 - 0.0004 \times Z - 0.0368 \quad (3)$$

$$to \geq 2E\text{-}05 \times Z^2 - 0.0029 \times Z + 0.136 \quad (4)$$

Condition (B)
the translucent substrate is formed by stacking two inorganic crystal materials, and when a design wavelength is "λ," a plate thickness of the translucent substrate is "to," and a cutting angle of the inorganic crystal material is "Z," the relation between the design wavelength "λ," the cutting angle "Z," and the plate thickness "to" satisfies the following expressions (5), (6), (7), (8), and (9):

$$\lambda \leq -10.75 \times Z^2 + 1933.9 \times Z - 86330 \quad (5)$$

$$\lambda \geq 6.25 \times Z^2 - 1126.6 \times Z + 51216 \quad (6)$$

$$to \leq -0.0281 \times Z^2 + 5.0512 \times Z - 225.61 \quad (7)$$

$$to \geq 0.0173 \times Z^2 - 3.1146 \times Z + 141.39 \quad (8)$$

when a phase difference of a first inorganic crystal material among the two inorganic crystal materials in an advancing direction of a light beam advancing in the translucent substrate is Γ1, and a phase difference of a second inorganic crystal material is Γ2, the following expression is satisfied:

$$|\Gamma 1 - \Gamma 2| = 180 (\text{deg}) \quad (9)$$

Condition (C)
the translucent substrate is formed by stacking two inorganic crystal materials, and when a design wavelength is "λ," a plate thickness of the translucent substrate is "to," and a cutting angle of the inorganic crystal material is "Z," the relation between the design wavelength "λ," the cutting angle "Z," and the plate thickness "to" satisfies the following expressions (10), (11), (12), and (13):

$$\lambda \leq -2E\text{-}07 \times Z^6 + 0.0001 \times Z^5 - 0.024 \times Z^4 + 2.7749 \times Z^3 - 178.61 \times Z^2 + 6067.8 \times Z - 84312 \quad (10)$$

$$\lambda \geq -4E\text{-}05 \times Z^3 + 0.0757 \times Z^2 - 10.073 \times Z + 696.9 \quad (11)$$

$$to \leq -2E\text{-}08 \times Z^4 + 6E\text{-}06 \times Z^3 - 0.0008 \times Z^2 + 0.0495 \times Z - 0.9844 \quad (12)$$

$$to \geq 5E\text{-}07 \times Z^3 - 0.0001 \times Z^2 + 0.0065 \times Z - 0.0924 \quad (13).$$

2. The polarization converting element according to claim 1,
wherein when Condition (A) is satisfied, and an optical axis azimuth seen from a normal of the translucent substrate is $\theta_0$, an optical axis azimuth with respect to a light beam advancing in the translucent substrate is $\theta_1$, the angle between the light beam and the normal of a crystal optical axis is $\theta_2$, the refractive index of the translucent substrate is $n_c$, the refractive index of a layer adjacent to the translucent substrate is $n_a$, and an incidence angle is α, the following expressions (A1) and (A2) are satisfied:

$$\theta_0 = a\tan(\tan\theta_1 \times \cos\theta_2) \quad (A1)$$

$$n_a \sin\alpha = n_c \sin\theta_2 \quad (A2).$$

3. The polarization converting element according to claim 1,
wherein when Condition (B) or (C) is satisfied, and an optical axis azimuth of the first inorganic crystal material seen from a normal of the translucent substrate is $\theta_{01}$, an optical axis azimuth with respect to a light beam advancing in the first inorganic crystal material is $\theta_{11}$, the angle between the light beam and the normal of a crystal optical axis is $\theta_{21}$, the refractive index of the first inorganic crystal material is $n_{c1}$, the refractive index of a layer adjacent to the first inorganic crystal material is $n_a$, and an incidence angle is α, the following expressions (A11) and (A21) are satisfied:

$$\theta_{01} = a\tan(\tan\theta_{11} \times \cos\theta_{21}) \quad (A11)$$

$$n_a \sin\alpha = n_{c1} \sin\theta_{21} \quad (A21)$$

wherein when an optical axis azimuth of the second inorganic crystal material seen from a normal of the translucent substrate is $\theta_{02}$, an optical axis azimuth with respect to a light beam advancing in the second inorganic crystal material is $\theta_{12}$, the angle between the light beam and the normal of a crystal optical axis is $\theta_{22}$, the refractive index of the second inorganic crystal material is $n_{c2}$, and the refractive index of the first inorganic crystal material adjacent to the second inorganic crystal material is $n_{c1}$, the following expressions (A12) and (A22) are satisfied:

$$\theta_{02} = a\tan(\tan\theta_{12} \times \cos\theta_{22}) \quad (A12)$$

$$n_{c1}\sin\theta_{21} = n_{c2}\sin\theta_{22} \quad (A22).$$

4. The polarization converting element according to claim 2, wherein the incidence angle α is about 45 deg or 135 deg.

5. The polarization converting element according to claim 2, wherein the crystal material is a quartz crystal.

6. The polarization converting element according to claim 1, wherein the reflecting element includes a quartz crystal plate and a mirror portion formed on a surface of the quartz crystal plate.

7. A polarization converting unit comprising:
the polarization converting element according to claim 1; and
a holding member that holds the polarization converting element,
wherein the holding member includes
a pair of holding plates that holds both ends of the translucent substrate and both ends of the reflecting element, respectively, and
a pair of connecting plates that connects both ends of the pair of holding plates, respectively.

8. A polarization converting unit comprising:
the polarization converting element according to claim 2; and
a holding member that holds the polarization converting element,
wherein the holding member includes
a pair of holding plates that holds both ends of the translucent substrate and both ends of the reflecting element, respectively, and
a pair of connecting plates that connects both ends of the pair of holding plates, respectively.

9. A polarization converting unit comprising:
the polarization converting element according to claim 3; and
a holding member that holds the polarization converting element,
wherein the holding member includes
a pair of holding plates that holds both ends of the translucent substrate and both ends of the reflecting element, respectively, and
a pair of connecting plates that connects both ends of the pair of holding plates, respectively.

10. The polarization converting unit according to claim 7,
wherein the pair of holding plates and the pair of connecting plates are formed to be integrated with each other,
guide grooves for guiding the translucent substrate and the reflecting element, respectively, are formed in portions of the pair of holding plates facing each other, and
the guide grooves are opened to one set of side surfaces of the pair of holding plates, respectively.

11. The polarization converting unit according to claim 8,
wherein the pair of holding plates and the pair of connecting plates are formed to be integrated with each other,
guide grooves for guiding the translucent substrate and the reflecting element, respectively, are formed in portions of the pair of holding plates facing each other, and
the guide grooves are opened to one set of side surfaces of the pair of holding plates, respectively.

12. The polarization converting unit according to claim 9,
wherein the pair of holding plates and the pair of connecting plates are formed to be integrated with each other,
guide grooves for guiding the translucent substrate and the reflecting element, respectively, are formed in portions of the pair of holding plates facing each other, and
the guide grooves are opened to one set of side surfaces of the pair of holding plates, respectively.

13. The polarization converting unit according to claim 10,
wherein the pair of holding plates and the pair of connecting plates are formed to be separated from each other, and
wherein the pair of connecting plates includes engaging pieces that bias the pair of holding plates in such a direction as to face each other.

14. The polarization converting unit according to claim 11,
wherein the pair of holding plates and the pair of connecting plates are formed to be separated from each other, and
wherein the pair of connecting plates includes engaging pieces that bias the pair of holding plates in such a direction as to face each other.

15. The polarization converting unit according to claim 12,
wherein the pair of holding plates and the pair of connecting plates are formed to be separated from each other, and
wherein the pair of connecting plates includes engaging pieces that bias the pair of holding plates in such a direction as to face each other.

16. A projection-type imaging device comprising:
a light source;
a polarization converting element that converts light from the light source into the second linearly polarized light beam and outputs the second linearly polarized light beam;
an optical modulation unit that modulates the light output from the polarization converting element in accordance with image information to be projected; and
a projection optical system that projects the light modulated by the optical modulation unit,
wherein the polarization converting element is the polarization converting element according to claim 1.

17. A projection-type imaging device comprising:
a light source;
a polarization converting element that converts light from the light source into the second linearly polarized light beam and outputs the second linearly polarized light beam;
an optical modulation unit that modulates the light output from the polarization converting element in accordance with image information to be projected; and
a projection optical system that projects the light modulated by the optical modulation unit,
wherein the polarization converting element is the polarization converting element according to claim 2.

18. A projection-type imaging device comprising:
a light source;
a polarization converting element that converts light from the light source into the second linearly polarized light beam and outputs the second linearly polarized light beam;
an optical modulation unit that modulates the light output from the polarization converting element in accordance with image information to be projected; and
a projection optical system that projects the light modulated by the optical modulation unit, wherein the polarization converting element is the polarization converting element according to claim 3.

19. The projection-type imaging device according to claim 16,
wherein the optical modulation unit is a liquid crystal panel.

20. The projection-type imaging device according to claim 17,
wherein the optical modulation unit is a liquid crystal panel.

* * * * *